US008150178B2

(12) United States Patent
Song

(10) Patent No.: US 8,150,178 B2
(45) Date of Patent: Apr. 3, 2012

(54) IMAGE ENCODING/DECODING METHOD AND APPARATUS

(75) Inventor: Byung-cheol Song, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1373 days.

(21) Appl. No.: 11/727,080

(22) Filed: Mar. 23, 2007

(65) Prior Publication Data

US 2008/0019597 A1 Jan. 24, 2008

Related U.S. Application Data

(60) Provisional application No. 60/784,911, filed on Mar. 23, 2006, provisional application No. 60/786,722, filed on Mar. 29, 2006.

(30) Foreign Application Priority Data

Jul. 6, 2006 (KR) .................. 10-2006-0063485

(51) Int. Cl.
*G06K 9/36* (2006.01)
*G06K 9/46* (2006.01)
(52) U.S. Cl. .................. 382/233; 382/166; 382/238
(58) Field of Classification Search .................. 382/233, 382/166, 238
See application file for complete search history.

(56) References Cited

U.S. PATENT DOCUMENTS

| 7,697,783 B2 * | 4/2010 | Lee et al. ............ 382/275 |
| 7,792,370 B2 * | 9/2010 | Sun .................. 382/232 |
| 2005/0013370 A1 | 1/2005 | Kim et al. |
| 2005/0111741 A1 | 5/2005 | Kim et al. |
| 2005/0281473 A1 | 12/2005 | Kim et al. |

OTHER PUBLICATIONS

Benierbah, S. et., al. "Lossless Color and Multispectral Images Coding With Inter-Band Compensated Prediction", IEEE 2004, pp. 427-430.
Biemond, J. et., al. "Visual Communications and Image Processing '97", The International Society for Optical Engineering, Feb. 12-14, 1997, vol. 3024, 14 pages total.
Extended European Search Report issued on Sep. 5, 2011 in the corresponding European Patent Application No. 07745603.6.
Goffman-Vinopal, L et., al. "Color Image Compression using Inter-color Correlation", IEEE ICIP, 2002, pp. II-353-II 356.
Mlsna, P. A. et., al. "Gradient and Laplacian-Type Edge Detection", Handbook of Image and Video Processing, pp. 415-431, 2000.
Rao, A. K. et., al. "Multispectral Data Compression Using Bidirectional Interband Prediction", IEEE Transactions on Geoscience and Remote Sensing, vol. 34, No. 2, Mar. 1996, pp. 385-397.

(Continued)

*Primary Examiner* — Phuoc Tran
(74) *Attorney, Agent, or Firm* — Sughrue Mion, PLLC

(57) ABSTRACT

Provided are an image encoding/decoding method and apparatus, in which one of a plurality of color component images is predicted from a different color component image reconstructed using a correlation between the plurality of color component images. Using a reconstructed image of a first color component image selected from among the plurality of color component images forming a single color image, the other color component images are predicted.

12 Claims, 18 Drawing Sheets
(1 of 18 Drawing Sheet(s) Filed in Color)

OTHER PUBLICATIONS

Rizzo, F. et., al. "Low-Complexity Lossless Compression of Hyperspectral Imagery via Linear Prediction", IEEE Signal Processing Letters, vol. 12, No. 2, Feb. 2005, pp. 198-141.

Roterman, Y. et., al. "Progressive Image Coding Using Regional Color Correlation", 4th EURASIP Conference focused on Video/Image Processing Multimedia Communications, Jul. 2-5, 2003, Zagreb Croatia, pp. 65-70.

Spring, J. M. et., al. "Experiments in the Lossless Compression of Time Series Satellite Images Using Multispectral Image Compression Techniques", pp. 1437-1441, 1998.

Tretter, D. et., al. "Multispectral Image Coding", Handbook of Image and Video Processing, pp. 539-551, 2000.

Young, K. S. et., al. "Video Compression Using Inter Color Prediction Scheme", Video Communications and Image Processing, 2005, pp. 2248-2258.

* cited by examiner

FIG. 4
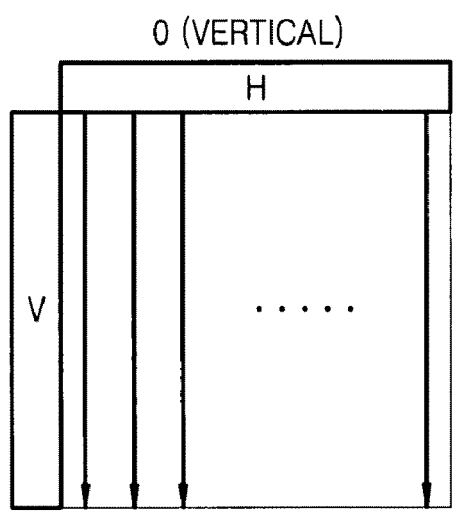
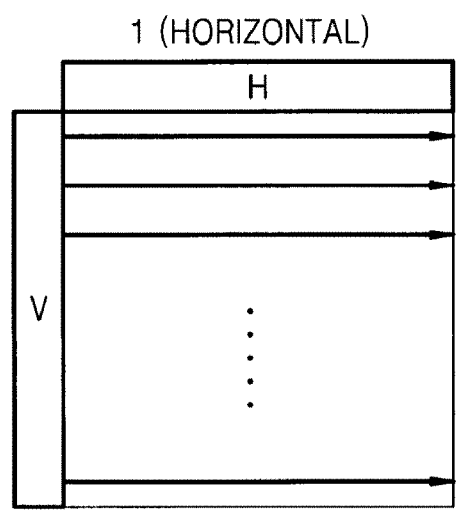
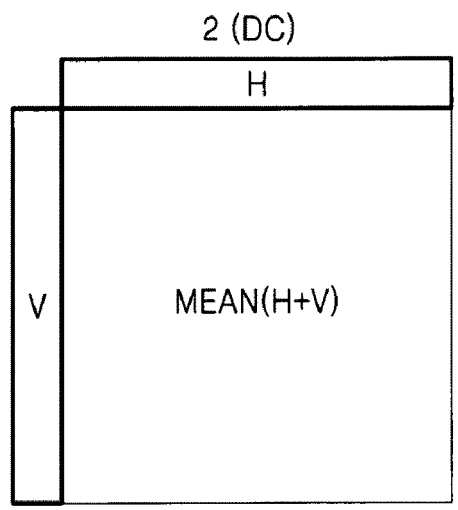
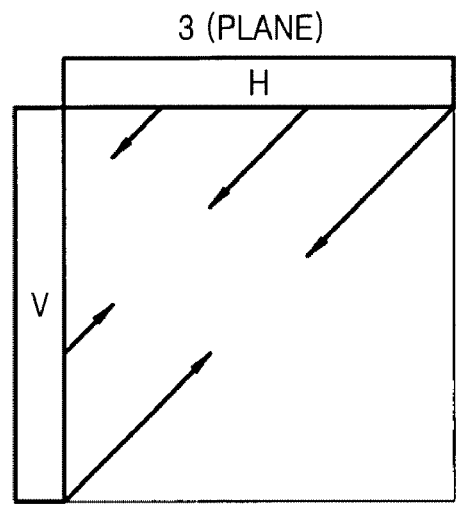

FIG. 7A

| $g_{-1,-1}$ | $g_{-1,0}$ | $g_{-1,1}$ | $g_{-1,2}$ | $g_{-1,3}$ | $g_{-1,4}$ | $g_{-1,5}$ | $g_{-1,6}$ | $g_{-1,7}$ | $g_{-1,8}$ | $g_{-1,9}$ | $g_{-1,10}$ | $g_{-1,11}$ | $g_{-1,12}$ | $g_{-1,13}$ | $g_{-1,14}$ | $g_{-1,15}$ |
|---|---|---|---|---|---|---|---|---|---|---|---|---|---|---|---|---|
| $g_{0,-1}$ | $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ | $g_{0,10}$ | $g_{0,11}$ | $g_{0,12}$ | $g_{0,13}$ | $g_{0,14}$ | $g_{0,15}$ |
| $g_{1,-1}$ | $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ | $g_{1,10}$ | $g_{1,11}$ | $g_{1,12}$ | $g_{1,13}$ | $g_{1,14}$ | $g_{1,15}$ |
| $g_{2,-1}$ | $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ | $g_{2,10}$ | $g_{2,11}$ | $g_{2,12}$ | $g_{2,13}$ | $g_{2,14}$ | $g_{2,15}$ |
| $g_{3,-1}$ | $g_{3,0}$ | $g_{3,1}$ | $g_{3,2}$ | $g_{3,3}$ | $g_{3,4}$ | $g_{3,5}$ | $g_{3,6}$ | $g_{3,7}$ | $g_{3,8}$ | $g_{3,9}$ | $g_{3,10}$ | $g_{3,11}$ | $g_{3,12}$ | $g_{3,13}$ | $g_{3,14}$ | $g_{3,15}$ |
| $g_{4,-1}$ | $g_{4,0}$ | $g_{4,1}$ | $g_{4,2}$ | $g_{4,3}$ | $g_{4,4}$ | $g_{4,5}$ | $g_{4,6}$ | $g_{4,7}$ | $g_{4,8}$ | $g_{4,9}$ | $g_{4,10}$ | $g_{4,11}$ | $g_{4,12}$ | $g_{4,13}$ | $g_{4,14}$ | $g_{4,15}$ |
| $g_{5,-1}$ | $g_{5,0}$ | $g_{5,1}$ | $g_{5,2}$ | $g_{5,3}$ | $g_{5,4}$ | $g_{5,5}$ | $g_{5,6}$ | $g_{5,7}$ | $g_{5,8}$ | $g_{5,9}$ | $g_{5,10}$ | $g_{5,11}$ | $g_{5,12}$ | $g_{5,13}$ | $g_{5,14}$ | $g_{5,15}$ |
| $g_{6,-1}$ | $g_{6,0}$ | $g_{6,1}$ | $g_{6,2}$ | $g_{6,3}$ | $g_{6,4}$ | $g_{6,5}$ | $g_{6,6}$ | $g_{6,7}$ | $g_{6,8}$ | $g_{6,9}$ | $g_{6,10}$ | $g_{6,11}$ | $g_{6,12}$ | $g_{6,13}$ | $g_{6,14}$ | $g_{6,15}$ |
| $g_{7,-1}$ | $g_{7,0}$ | $g_{7,1}$ | $g_{7,2}$ | $g_{7,3}$ | $g_{7,4}$ | $g_{7,5}$ | $g_{7,6}$ | $g_{7,7}$ | $g_{7,8}$ | $g_{7,9}$ | $g_{7,10}$ | $g_{7,11}$ | $g_{7,12}$ | $g_{7,13}$ | $g_{7,14}$ | $g_{7,15}$ |
| $g_{8,-1}$ | $g_{8,0}$ | $g_{8,1}$ | $g_{8,2}$ | $g_{8,3}$ | $g_{8,4}$ | $g_{8,5}$ | $g_{8,6}$ | $g_{8,7}$ | $g_{8,8}$ | $g_{8,9}$ | $g_{8,10}$ | $g_{8,11}$ | $g_{8,12}$ | $g_{8,13}$ | $g_{8,14}$ | $g_{8,15}$ |
| $g_{9,-1}$ | $g_{9,0}$ | $g_{9,1}$ | $g_{9,2}$ | $g_{9,3}$ | $g_{9,4}$ | $g_{9,5}$ | $g_{9,6}$ | $g_{9,7}$ | $g_{9,8}$ | $g_{9,9}$ | $g_{9,10}$ | $g_{9,11}$ | $g_{9,12}$ | $g_{9,13}$ | $g_{9,14}$ | $g_{9,15}$ |
| $g_{10,-1}$ | $g_{10,0}$ | $g_{10,1}$ | $g_{10,2}$ | $g_{10,3}$ | $g_{10,4}$ | $g_{10,5}$ | $g_{10,6}$ | $g_{10,7}$ | $g_{10,8}$ | $g_{10,9}$ | $g_{10,10}$ | $g_{10,11}$ | $g_{10,12}$ | $g_{10,13}$ | $g_{10,14}$ | $g_{10,15}$ |
| $g_{11,-1}$ | $g_{11,0}$ | $g_{11,1}$ | $g_{11,2}$ | $g_{11,3}$ | $g_{11,4}$ | $g_{11,5}$ | $g_{11,6}$ | $g_{11,7}$ | $g_{11,8}$ | $g_{11,9}$ | $g_{11,10}$ | $g_{11,11}$ | $g_{11,12}$ | $g_{11,13}$ | $g_{11,14}$ | $g_{11,15}$ |
| $g_{12,-1}$ | $g_{12,0}$ | $g_{12,1}$ | $g_{12,2}$ | $g_{12,3}$ | $g_{12,4}$ | $g_{12,5}$ | $g_{12,6}$ | $g_{12,7}$ | $g_{12,8}$ | $g_{12,9}$ | $g_{12,10}$ | $g_{12,11}$ | $g_{12,12}$ | $g_{12,13}$ | $g_{12,14}$ | $g_{12,15}$ |
| $g_{13,-1}$ | $g_{13,0}$ | $g_{13,1}$ | $g_{13,2}$ | $g_{13,3}$ | $g_{13,4}$ | $g_{13,5}$ | $g_{13,6}$ | $g_{13,7}$ | $g_{13,8}$ | $g_{13,9}$ | $g_{13,10}$ | $g_{13,11}$ | $g_{13,12}$ | $g_{13,13}$ | $g_{13,14}$ | $g_{13,15}$ |
| $g_{14,-1}$ | $g_{14,0}$ | $g_{14,1}$ | $g_{14,2}$ | $g_{14,3}$ | $g_{14,4}$ | $g_{14,5}$ | $g_{14,6}$ | $g_{14,7}$ | $g_{14,8}$ | $g_{14,9}$ | $g_{14,10}$ | $g_{14,11}$ | $g_{14,12}$ | $g_{14,13}$ | $g_{14,14}$ | $g_{14,15}$ |
| $g_{15,-1}$ | $g_{15,0}$ | $g_{15,1}$ | $g_{15,2}$ | $g_{15,3}$ | $g_{15,4}$ | $g_{15,5}$ | $g_{15,6}$ | $g_{15,7}$ | $g_{15,8}$ | $g_{15,9}$ | $g_{15,10}$ | $g_{15,11}$ | $g_{15,12}$ | $g_{15,13}$ | $g_{15,14}$ | $g_{15,15}$ |

FIG. 7B

| $b_{-1,-1}$ | $b_{-1,0}$ | $b_{-1,1}$ | $b_{-1,2}$ | $b_{-1,3}$ | $b_{-1,4}$ | $b_{-1,5}$ | $b_{-1,6}$ | $b_{-1,7}$ | $b_{-1,8}$ | $b_{-1,9}$ | $b_{-1,10}$ | $b_{-1,11}$ | $b_{-1,12}$ | $b_{-1,13}$ | $b_{-1,14}$ | $b_{-1,15}$ |
|---|---|---|---|---|---|---|---|---|---|---|---|---|---|---|---|---|
| $b_{0,-1}$ | $b_{0,0}$ | $b_{0,1}$ | $b_{0,2}$ | $b_{0,3}$ | $b_{0,4}$ | $b_{0,5}$ | $b_{0,6}$ | $b_{0,7}$ | $b_{0,8}$ | $b_{0,9}$ | $b_{0,10}$ | $b_{0,11}$ | $b_{0,12}$ | $b_{0,13}$ | $b_{0,14}$ | $b_{0,15}$ |
| $b_{1,-1}$ | $b_{1,0}$ | $b_{1,1}$ | $b_{1,2}$ | $b_{1,3}$ | $b_{1,4}$ | $b_{1,5}$ | $b_{1,6}$ | $b_{1,7}$ | $b_{1,8}$ | $b_{1,9}$ | $b_{1,10}$ | $b_{1,11}$ | $b_{1,12}$ | $b_{1,13}$ | $b_{1,14}$ | $b_{1,15}$ |
| $b_{2,-1}$ | $b_{2,0}$ | $b_{2,1}$ | $b_{2,2}$ | $b_{2,3}$ | $b_{2,4}$ | $b_{2,5}$ | $b_{2,6}$ | $b_{2,7}$ | $b_{2,8}$ | $b_{2,9}$ | $b_{2,10}$ | $b_{2,11}$ | $b_{2,12}$ | $b_{2,13}$ | $b_{2,14}$ | $b_{2,15}$ |
| $b_{3,-1}$ | $b_{3,0}$ | $b_{3,1}$ | $b_{3,2}$ | $b_{3,3}$ | $b_{3,4}$ | $b_{3,5}$ | $b_{3,6}$ | $b_{3,7}$ | $b_{3,8}$ | $b_{3,9}$ | $b_{3,10}$ | $b_{3,11}$ | $b_{3,12}$ | $b_{3,13}$ | $b_{3,14}$ | $b_{3,15}$ |
| $b_{4,-1}$ | $b_{4,0}$ | $b_{4,1}$ | $b_{4,2}$ | $b_{4,3}$ | $b_{4,4}$ | $b_{4,5}$ | $b_{4,6}$ | $b_{4,7}$ | $b_{4,8}$ | $b_{4,9}$ | $b_{4,10}$ | $b_{4,11}$ | $b_{4,12}$ | $b_{4,13}$ | $b_{4,14}$ | $b_{4,15}$ |
| $b_{5,-1}$ | $b_{5,0}$ | $b_{5,1}$ | $b_{5,2}$ | $b_{5,3}$ | $b_{5,4}$ | $b_{5,5}$ | $b_{5,6}$ | $b_{5,7}$ | $b_{5,8}$ | $b_{5,9}$ | $b_{5,10}$ | $b_{5,11}$ | $b_{5,12}$ | $b_{5,13}$ | $b_{5,14}$ | $b_{5,15}$ |
| $b_{6,-1}$ | $b_{6,0}$ | $b_{6,1}$ | $b_{6,2}$ | $b_{6,3}$ | $b_{6,4}$ | $b_{6,5}$ | $b_{6,6}$ | $b_{6,7}$ | $b_{6,8}$ | $b_{6,9}$ | $b_{6,10}$ | $b_{6,11}$ | $b_{6,12}$ | $b_{6,13}$ | $b_{6,14}$ | $b_{6,15}$ |
| $b_{7,-1}$ | $b_{7,0}$ | $b_{7,1}$ | $b_{7,2}$ | $b_{7,3}$ | $b_{7,4}$ | $b_{7,5}$ | $b_{7,6}$ | $b_{7,7}$ | $b_{7,8}$ | $b_{7,9}$ | $b_{7,10}$ | $b_{7,11}$ | $b_{7,12}$ | $b_{7,13}$ | $b_{7,14}$ | $b_{7,15}$ |
| $b_{8,-1}$ | $b_{8,0}$ | $b_{8,1}$ | $b_{8,2}$ | $b_{8,3}$ | $b_{8,4}$ | $b_{8,5}$ | $b_{8,6}$ | $b_{8,7}$ | $b_{8,8}$ | $b_{8,9}$ | $b_{8,10}$ | $b_{8,11}$ | $b_{8,12}$ | $b_{8,13}$ | $b_{8,14}$ | $b_{8,15}$ |
| $b_{9,-1}$ | $b_{9,0}$ | $b_{9,1}$ | $b_{9,2}$ | $b_{9,3}$ | $b_{9,4}$ | $b_{9,5}$ | $b_{9,6}$ | $b_{9,7}$ | $b_{9,8}$ | $b_{9,9}$ | $b_{9,10}$ | $b_{9,11}$ | $b_{9,12}$ | $b_{9,13}$ | $b_{9,14}$ | $b_{9,15}$ |
| $b_{10,-1}$ | $b_{10,0}$ | $b_{10,1}$ | $b_{10,2}$ | $b_{10,3}$ | $b_{10,4}$ | $b_{10,5}$ | $b_{10,6}$ | $b_{10,7}$ | $b_{10,8}$ | $b_{10,9}$ | $b_{10,10}$ | $b_{10,11}$ | $b_{10,12}$ | $b_{10,13}$ | $b_{10,14}$ | $b_{10,15}$ |
| $b_{11,-1}$ | $b_{11,0}$ | $b_{11,1}$ | $b_{11,2}$ | $b_{11,3}$ | $b_{11,4}$ | $b_{11,5}$ | $b_{11,6}$ | $b_{11,7}$ | $b_{11,8}$ | $b_{11,9}$ | $b_{11,10}$ | $b_{11,11}$ | $b_{11,12}$ | $b_{11,13}$ | $b_{11,14}$ | $b_{11,15}$ |
| $b_{12,-1}$ | $b_{12,0}$ | $b_{12,1}$ | $b_{12,2}$ | $b_{12,3}$ | $b_{12,4}$ | $b_{12,5}$ | $b_{12,6}$ | $b_{12,7}$ | $b_{12,8}$ | $b_{12,9}$ | $b_{12,10}$ | $b_{12,11}$ | $b_{12,12}$ | $b_{12,13}$ | $b_{12,14}$ | $b_{12,15}$ |
| $b_{13,-1}$ | $b_{13,0}$ | $b_{13,1}$ | $b_{13,2}$ | $b_{13,3}$ | $b_{13,4}$ | $b_{13,5}$ | $b_{13,6}$ | $b_{13,7}$ | $b_{13,8}$ | $b_{13,9}$ | $b_{13,10}$ | $b_{13,11}$ | $b_{13,12}$ | $b_{13,13}$ | $b_{13,14}$ | $b_{13,15}$ |
| $b_{14,-1}$ | $b_{14,0}$ | $b_{14,1}$ | $b_{14,2}$ | $b_{14,3}$ | $b_{14,4}$ | $b_{14,5}$ | $b_{14,6}$ | $b_{14,7}$ | $b_{14,8}$ | $b_{14,9}$ | $b_{14,10}$ | $b_{14,11}$ | $b_{14,12}$ | $b_{14,13}$ | $b_{14,14}$ | $b_{14,15}$ |
| $b_{15,-1}$ | $b_{15,0}$ | $b_{15,1}$ | $b_{15,2}$ | $b_{15,3}$ | $b_{15,4}$ | $b_{15,5}$ | $b_{15,6}$ | $b_{15,7}$ | $b_{15,8}$ | $b_{15,9}$ | $b_{15,10}$ | $b_{15,11}$ | $b_{15,12}$ | $b_{15,13}$ | $b_{15,14}$ | $b_{15,15}$ |

FIG. 7C

| | $r_{-1,0}$ | $r_{-1,1}$ | $r_{-1,2}$ | $r_{-1,3}$ | $r_{-1,4}$ | $r_{-1,5}$ | $r_{-1,6}$ | $r_{-1,7}$ | $r_{-1,8}$ | $r_{-1,9}$ | $r_{-1,10}$ | $r_{-1,11}$ | $r_{-1,12}$ | $r_{-1,13}$ | $r_{-1,14}$ | $r_{-1,15}$ |
|---|---|---|---|---|---|---|---|---|---|---|---|---|---|---|---|---|
| $r_{0,-1}$ | $r_{0,0}$ | $r_{0,1}$ | $r_{0,2}$ | $r_{0,3}$ | $r_{0,4}$ | $r_{0,5}$ | $r_{0,6}$ | $r_{0,7}$ | $r_{0,8}$ | $r_{0,9}$ | $r_{0,10}$ | $r_{0,11}$ | $r_{0,12}$ | $r_{0,13}$ | $r_{0,14}$ | $r_{0,15}$ |
| $r_{1,-1}$ | $r_{1,0}$ | $r_{1,1}$ | $r_{1,2}$ | $r_{1,3}$ | $r_{1,4}$ | $r_{1,5}$ | $r_{1,6}$ | $r_{1,7}$ | $r_{1,8}$ | $r_{1,9}$ | $r_{1,10}$ | $r_{1,11}$ | $r_{1,12}$ | $r_{1,13}$ | $r_{1,14}$ | $r_{1,15}$ |
| $r_{2,-1}$ | $r_{2,0}$ | $r_{2,1}$ | $r_{2,2}$ | $r_{2,3}$ | $r_{2,4}$ | $r_{2,5}$ | $r_{2,6}$ | $r_{2,7}$ | $r_{2,8}$ | $r_{2,9}$ | $r_{2,10}$ | $r_{2,11}$ | $r_{2,12}$ | $r_{2,13}$ | $r_{2,14}$ | $r_{2,15}$ |
| $r_{3,-1}$ | $r_{3,0}$ | $r_{3,1}$ | $r_{3,2}$ | $r_{3,3}$ | $r_{3,4}$ | $r_{3,5}$ | $r_{3,6}$ | $r_{3,7}$ | $r_{3,8}$ | $r_{3,9}$ | $r_{3,10}$ | $r_{3,11}$ | $r_{3,12}$ | $r_{3,13}$ | $r_{3,14}$ | $r_{3,15}$ |
| $r_{4,-1}$ | $r_{4,0}$ | $r_{4,1}$ | $r_{4,2}$ | $r_{4,3}$ | $r_{4,4}$ | $r_{4,5}$ | $r_{4,6}$ | $r_{4,7}$ | $r_{4,8}$ | $r_{4,9}$ | $r_{4,10}$ | $r_{4,11}$ | $r_{4,12}$ | $r_{4,13}$ | $r_{4,14}$ | $r_{4,15}$ |
| $r_{5,-1}$ | $r_{5,0}$ | $r_{5,1}$ | $r_{5,2}$ | $r_{5,3}$ | $r_{5,4}$ | $r_{5,5}$ | $r_{5,6}$ | $r_{5,7}$ | $r_{5,8}$ | $r_{5,9}$ | $r_{5,10}$ | $r_{5,11}$ | $r_{5,12}$ | $r_{5,13}$ | $r_{5,14}$ | $r_{5,15}$ |
| $r_{6,-1}$ | $r_{6,0}$ | $r_{6,1}$ | $r_{6,2}$ | $r_{6,3}$ | $r_{6,4}$ | $r_{6,5}$ | $r_{6,6}$ | $r_{6,7}$ | $r_{6,8}$ | $r_{6,9}$ | $r_{6,10}$ | $r_{6,11}$ | $r_{6,12}$ | $r_{6,13}$ | $r_{6,14}$ | $r_{6,15}$ |
| $r_{7,-1}$ | $r_{7,0}$ | $r_{7,1}$ | $r_{7,2}$ | $r_{7,3}$ | $r_{7,4}$ | $r_{7,5}$ | $r_{7,6}$ | $r_{7,7}$ | $r_{7,8}$ | $r_{7,9}$ | $r_{7,10}$ | $r_{7,11}$ | $r_{7,12}$ | $r_{7,13}$ | $r_{7,14}$ | $r_{7,15}$ |
| $r_{8,-1}$ | $r_{8,0}$ | $r_{8,1}$ | $r_{8,2}$ | $r_{8,3}$ | $r_{8,4}$ | $r_{8,5}$ | $r_{8,6}$ | $r_{8,7}$ | $r_{8,8}$ | $r_{8,9}$ | $r_{8,10}$ | $r_{8,11}$ | $r_{8,12}$ | $r_{8,13}$ | $r_{8,14}$ | $r_{8,15}$ |
| $r_{9,-1}$ | $r_{9,0}$ | $r_{9,1}$ | $r_{9,2}$ | $r_{9,3}$ | $r_{9,4}$ | $r_{9,5}$ | $r_{9,6}$ | $r_{9,7}$ | $r_{9,8}$ | $r_{9,9}$ | $r_{9,10}$ | $r_{9,11}$ | $r_{9,12}$ | $r_{9,13}$ | $r_{9,14}$ | $r_{9,15}$ |
| $r_{10,-1}$ | $r_{10,0}$ | $r_{10,1}$ | $r_{10,2}$ | $r_{10,3}$ | $r_{10,4}$ | $r_{10,5}$ | $r_{10,6}$ | $r_{10,7}$ | $r_{10,8}$ | $r_{10,9}$ | $r_{10,10}$ | $r_{10,11}$ | $r_{10,12}$ | $r_{10,13}$ | $r_{10,14}$ | $r_{10,15}$ |
| $r_{11,-1}$ | $r_{11,0}$ | $r_{11,1}$ | $r_{11,2}$ | $r_{11,3}$ | $r_{11,4}$ | $r_{11,5}$ | $r_{11,6}$ | $r_{11,7}$ | $r_{11,8}$ | $r_{11,9}$ | $r_{11,10}$ | $r_{11,11}$ | $r_{11,12}$ | $r_{11,13}$ | $r_{11,14}$ | $r_{11,15}$ |
| $r_{12,-1}$ | $r_{12,0}$ | $r_{12,1}$ | $r_{12,2}$ | $r_{12,3}$ | $r_{12,4}$ | $r_{12,5}$ | $r_{12,6}$ | $r_{12,7}$ | $r_{12,8}$ | $r_{12,9}$ | $r_{12,10}$ | $r_{12,11}$ | $r_{12,12}$ | $r_{12,13}$ | $r_{12,14}$ | $r_{12,15}$ |
| $r_{13,-1}$ | $r_{13,0}$ | $r_{13,1}$ | $r_{13,2}$ | $r_{13,3}$ | $r_{13,4}$ | $r_{13,5}$ | $r_{13,6}$ | $r_{13,7}$ | $r_{13,8}$ | $r_{13,9}$ | $r_{13,10}$ | $r_{13,11}$ | $r_{13,12}$ | $r_{13,13}$ | $r_{13,14}$ | $r_{13,15}$ |
| $r_{14,-1}$ | $r_{14,0}$ | $r_{14,1}$ | $r_{14,2}$ | $r_{14,3}$ | $r_{14,4}$ | $r_{14,5}$ | $r_{14,6}$ | $r_{14,7}$ | $r_{14,8}$ | $r_{14,9}$ | $r_{14,10}$ | $r_{14,11}$ | $r_{14,12}$ | $r_{14,13}$ | $r_{14,14}$ | $r_{14,15}$ |
| $r_{15,-1}$ | $r_{15,0}$ | $r_{15,1}$ | $r_{15,2}$ | $r_{15,3}$ | $r_{15,4}$ | $r_{15,5}$ | $r_{15,6}$ | $r_{15,7}$ | $r_{15,8}$ | $r_{15,9}$ | $r_{15,10}$ | $r_{15,11}$ | $r_{15,12}$ | $r_{15,13}$ | $r_{15,14}$ | $r_{15,15}$ |

IMAGE ENCODING/DECODING METHOD AND APPARATUS

CROSS-REFERENCE TO RELATED PATENT APPLICATION

This application claims priority from U.S. Provisional Application No. 60/784,911, filed on Mar. 23, 2006 and Ser. No. 60/786,722, filed on Mar. 29, 2006, in the U.S. Patent and Trademark Office, and Korean Patent Application No. 10-2006-0063485, filed on Jul. 6, 2006, in the Korean Intellectual Property Office, the disclosures of which are incorporated herein in their entirety by reference.

BACKGROUND OF THE INVENTION

1. Field of the Invention

Apparatuses and methods consistent with the present invention relate to image encoding and decoding, and more particularly, to image encoding/decoding in which one of a plurality of color component images of an image is predicted from a different color component image using a correlation between the color component images, thereby improving encoding efficiency.

2. Description of the Related Art

In general, when an image is captured, the captured original image is in a red, green, and blue (RGB) color format. To encode the RGB color format image, the RGB color format image is transformed into a YUV (or YCbCr) color format. Y is a black-white image and has a luminance component, and U (or Cb) and V (or Cr) have color components. Information is uniformly distributed over R, G, and B in an RGB image, but information is concentrated in Y and the amount of information in U (or Cb) and V (or Cr) is small in a YUV (or YCbCr) image. Thus, the YUV (or YCbCr) image can be compressed with high compression efficiency. To further improve compression efficiency, an YUV (or YCbCr) 4:2:0 image obtained by sampling color components U (or Cb) and V (or Cr) of an YUV (or YCbCr) image at a ratio of 1:4 is generally used.

However, since ¼ sampling of U (or Cb) and V (or Cr) in the YUV (or YCbCr) 4:2:0 image causes color distortion, it is not suitable for providing high display quality. Thus, a method for effectively encoding a YUV (or YCbCr) 4:4:4 image without sampling U (or Cb) and V (or Cr) is required. Recently, residual color transform (RCT), which directly encodes an RGB 4:4:4 image to remove color distortion occurring in transformation of an RGB image to a YUV (or YCbCr) image, has been suggested.

When an image like a YUV (or YCbCr) 4:4:4 image and an RGB 4:4:4 image, in which color components have the same resolution, is directly encoded using a related art encoding method, encoding efficiency is degraded. Thus, a method for improving encoding efficiency while maintaining high display quality by prediction based on the statistical characteristics of an image is required for a case where a YUV (or YCbCr) 4:4:4 image is encoded or an RGB image is encoded in an RGB domain without being transformed to a YUV (or YCbCr) format.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides an image encoding/decoding method and apparatus, in which one of a plurality of color component images forming a color image is predicted from a different color component image using a correlation between the color component images, thereby improving encoding efficiency.

According to an aspect of the present invention, there is provided an image encoding method comprising: (a) performing predictive encoding on a pixel block having a predetermined size of a first color component image of an input image including at least two color component images; (b) reconstructing the predictive-encoded pixel block of the first color component image; and (c) predicting a corresponding pixel block of a second color component image using pixel values of a reconstructed neighbor pixel block of the first color component image, pixel values of a reconstructed neighbor pixel block of the second color component image, and pixel values of the reconstructed pixel block of the first color component image.

An aspect of the present invention also provides an image encoding method comprising: (a) performing predictive encoding on a pixel block having a predetermined size of a first color component image of an input image including at least two color component images; (b) reconstructing the predictive-encoded pixel block of the first color component image; (c) detecting an edge in the reconstructed pixel block of the first color component image; (d) dividing the pixel block of the first color component image and a corresponding pixel block of a second color component image into areas using the detected edge; and (e) predicting pixel values in each of the areas of the second color component image using pixel values of a reconstructed neighbor pixel block of the first color component image, pixel values of a reconstructed neighbor pixel block of the second color component image, and pixel values of the reconstructed pixel block of the first color component image.

According to another aspect of the present invention, there is provided an image encoding apparatus comprising: a predictive encoding unit which performs predictive encoding on a pixel block having a predetermined size of a first color component image of an image including at least two color component images; a reconstruction unit which reconstructs the predictive-encoded pixel block of the first color component image; and a correlation prediction unit which predicts a corresponding pixel block of a second color component image using pixel values of a reconstructed neighbor pixel block of the first color component image, pixel values of a reconstructed neighbor pixel block of the second color component image, and pixel values of the reconstructed pixel block of the first color component image.

An aspect of the present invention also provides an image encoding apparatus comprising: a predictive encoding unit which performs predictive encoding on a pixel block having a predetermined size of a first color component image of an input image including at least two color component images; a reconstruction unit which reconstructs the predictive-encoded pixel block of the first color component image; an edge detection unit which detects an edge in the reconstructed pixel block of the first color component image; an area division unit which divides the pixel block of the first color component image into areas and a corresponding pixel block of a second color component image into areas using the detected edge; and a correlation prediction unit which predicts pixel values in each of the areas of the second color component image using pixel values of a reconstructed neighbor pixel block of the first color component image, pixel values of a reconstructed neighbor pixel block of the second color component image, and pixel values of the reconstructed pixel block of the first color component image.

According to another aspect of the present invention, there is provided an image decoding method comprising: (a) receiving a bitstream of an encoded image including at least two color component images; (b) decoding a pixel block having a predetermined size of a first color component image among the color component images; and (c) decoding a corresponding pixel block of a second color component image using pixel values of a decoded neighbor pixel block of the previously processed first color component image, pixel values of a decoded neighbor pixel block of the second color component image, and pixel values of the decoded pixel block of the first color component image.

An aspect of the present invention also provides an image decoding method comprising: (a) receiving a bitstream of an encoded image including at least two color component images; (b) decoding a pixel block having a predetermined size of a first color component image among the color component images; (c) detecting an edge in the decoded pixel block of the first color component image; (d) dividing the decoded pixel block of the first color component image and a corresponding pixel block of a second color component image into areas using the detected edge; and (e) decoding the pixel block of the second color component image by predicting pixel values in each of the areas of the second color component image using pixel values of a decoded neighbor pixel block of the first color component image, pixel values of a decoded neighbor pixel block of the second color component image, and pixel values of the decoded pixel block of the first color component image.

According to another aspect of the present invention, there is provided an image decoding apparatus comprising: a first color component decoding unit which receives a bitstream including a plurality of encoded color component images comprising at least two color components and decoding a pixel block having a predetermined size of a first color component image among the color component images; and a correlation decoding unit which decodes a corresponding pixel block of a second color component image using pixel values of a decoded neighbor pixel block of the previously processed first color component image, pixel values of a decoded neighbor pixel block of the second color component image, and pixel values of the decoded pixel block of the first color component image.

An aspect of the present invention also provides an image decoding apparatus comprising: a first color component decoding unit which receives a bitstream including at least two encoded color component images, decodes a pixel block having a predetermined size of a first color component image among the color component images by intra-prediction, and outputs the decoded pixel block of the first color component image; an edge detection unit which detects an edge in the decoded pixel block of the first color component image; an area division unit which divides the decoded pixel block of the first color component image and a corresponding pixel block of a second color component image into areas using the detected edge; and a correlation decoding unit which decodes the pixel block of the second color component image by predicting pixel values in each of the areas of the second color component image using pixel values of a decoded neighbor pixel block of the first color component image, pixel values of a decoded neighbor pixel block of the second color component image, and pixel values of the decoded pixel block of the first color component image.

BRIEF DESCRIPTION OF THE DRAWINGS

The patent or application file contains at least one drawing executed in color. Copies of this patent application publication with color drawing(s) will be provided by the Office upon request and payment of the necessary fee.

The above and other aspects of the present invention will become more apparent by describing in detail exemplary embodiments thereof with reference to the attached drawings in which:

FIG. 4 illustrates a 16×16 intra-prediction mode according to H.264;

FIG. 7A illustrates a 16×16 pixel block of a G color component image included in an input image;

FIG. 7B illustrates a 16×16 pixel block of a B color component image included in the input image;

FIG. 7C illustrates a 16×16 pixel block of a R color component image included in the input image;

FIG. 11A illustrates an example in which a pixel block of a G color component image is divided using an edge detected by an area division unit illustrated in FIG. 9;

FIG. 11B illustrates an example in which a pixel block of a B color component image is divided using an edge detected by the area division unit illustrated in FIG. 9;

FIG. 11C illustrates an example in which a pixel block of a R color component image is divided using an edge detected by the area division unit illustrated in FIG. 9;

DETAILED DESCRIPTION OF THE EXEMPLARY EMBODIMENTS OF THE INVENTION

Hereinafter, exemplary embodiments of the present invention will be described in detail with reference to the accompanying drawings.

Figure 1A:
FIGS. 1A through 1C illustrate red (R) color component image, green (G) color component image, and a blue (B) color component image of a single color image.
Figure 1B:
Figure 1C:
Figure 2A:
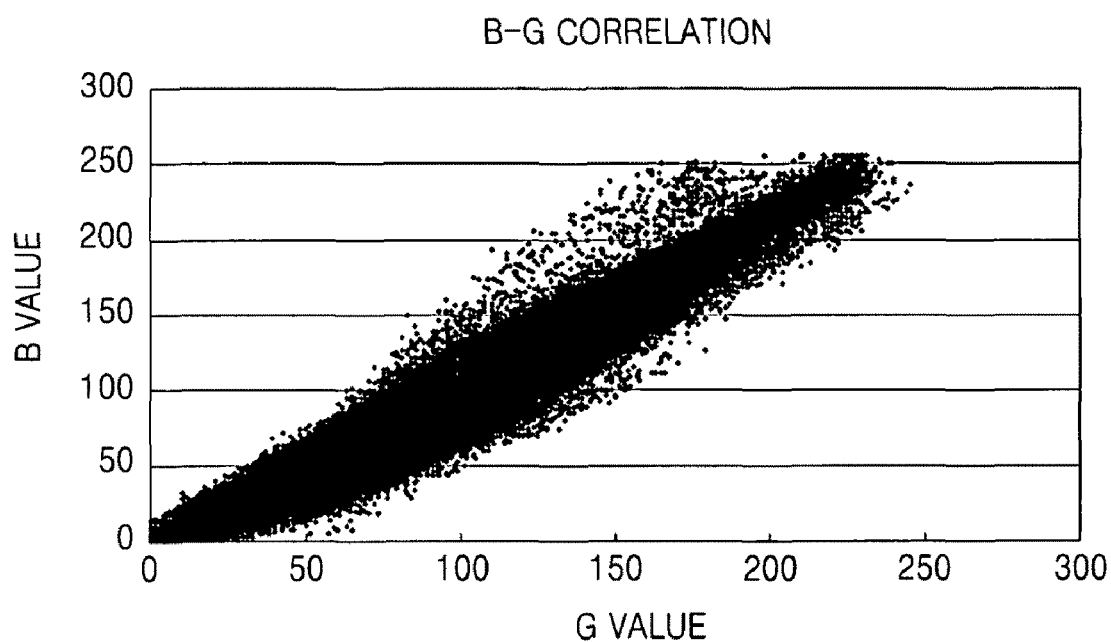
FIG. 2A is a graph showing correlation between the G color component image of FIG. 1B and the B color component image of FIG. 1C.
Figure 2B:
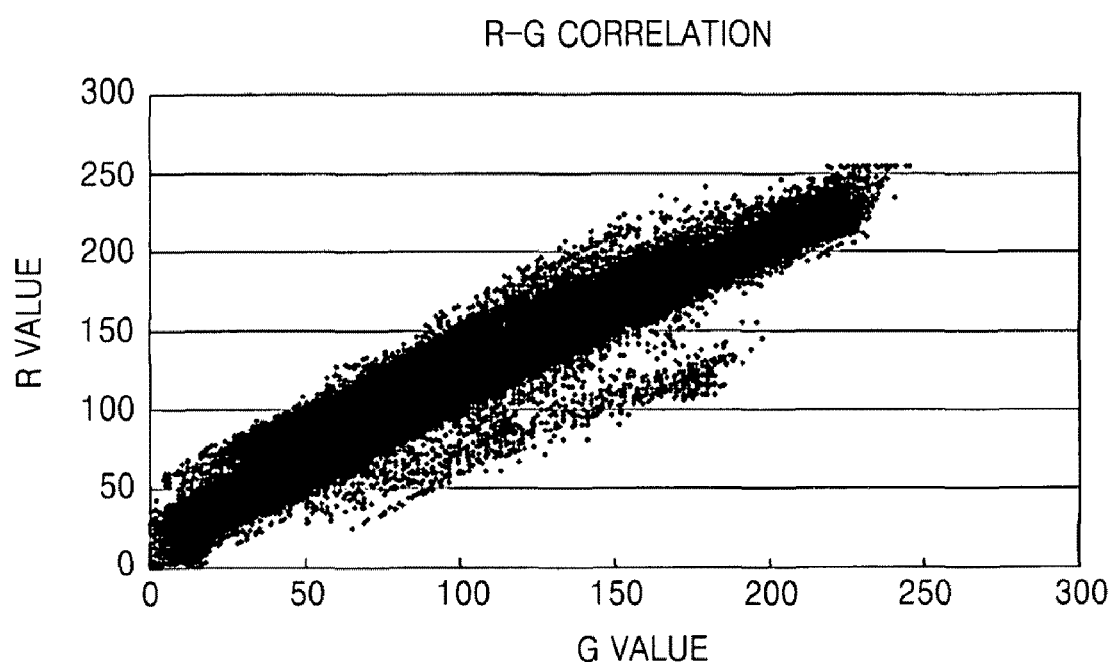
FIG. 2B is a graph showing correlation between the R color component image of FIG. 1A and the G color component image of FIG. 1B.

FIGS. 1A through 1C illustrate an R color component image, a G color component image, and a B color component image of a single color image, FIG. 2A is a graph showing correlation between the G color component image of FIG. 1B and the B color component image of FIG. 1C, and FIG. 2B is a graph showing correlation between the R color component image of FIG. 1A and the G color component image of FIG. 1B.

In general, when a color image is encoded, predictive encoding is performed on each of color component images to remove redundant information in each of color components. Referring to FIGS. 1A through 1C, pixels of RGB color component images of a single color image at the same position have similar pixel values, which can also be seen from graphs illustrated in FIGS. 2A and 2B.

Thus, according to an exemplary embodiment of the present invention, a first color component image selected from a plurality of color component images of an image is encoded according to general predictive encoding such as H.264 and the remaining color component images are predicted from a reconstructed first color component image based on a correlation between the color component images. For example, if an image includes three color components of RGB, a G color component image is first predictive-encoded by intra-prediction or inter prediction, a corresponding R color component image is predicted from a reconstructed G color component image, and the other B color component image is predicted from the reconstructed G color component image or a reconstructed R color component image, according to the present invention. In this example, the encoding order of the color component images may vary.

Figure 3:
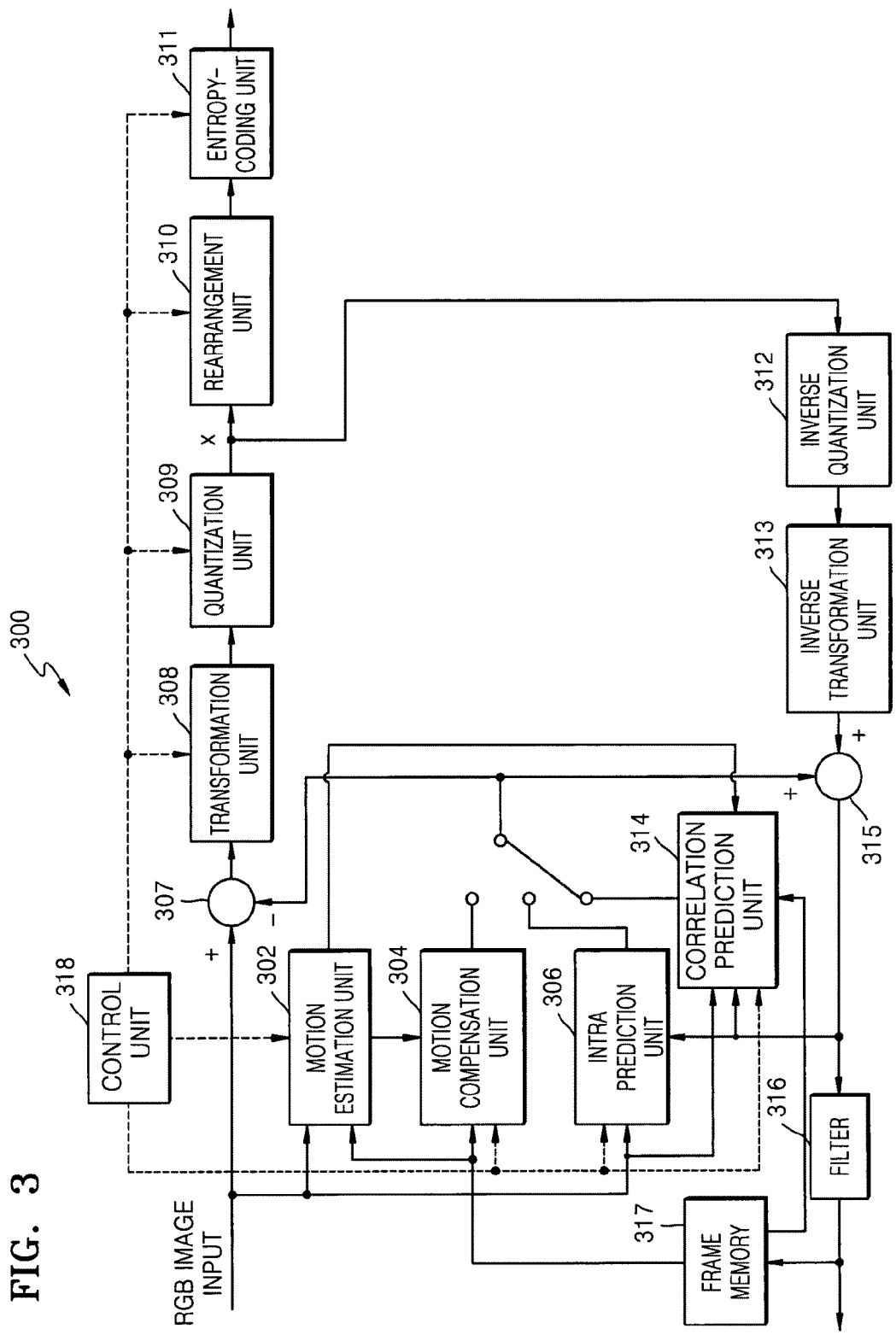
FIG. 3 is a block diagram of an image encoding apparatus according to an exemplary embodiment of the present invention.

FIG. 3 is a block diagram of an image encoding apparatus 300 according to an exemplary embodiment of the present invention. Although the image encoding apparatus 300 is assumed to comply with H.264 for convenience of explanation, it may also be applied to other image encoding apparatuses which perform residue coding.

Referring to FIG. 3, the image encoding apparatus 300 includes a motion estimation unit 302, a motion compensation unit 304, an intra-prediction unit 306, a subtraction unit 307, a transformation unit 308, a quantization unit 309, a rearrangement unit 310, an entropy-coding unit 311, an inverse quantization unit 312, an inverse transformation unit 313, a correlation prediction unit 314, an addition unit 315, a filter 316, a frame memory 317, and a control unit 318.

Figure 5:
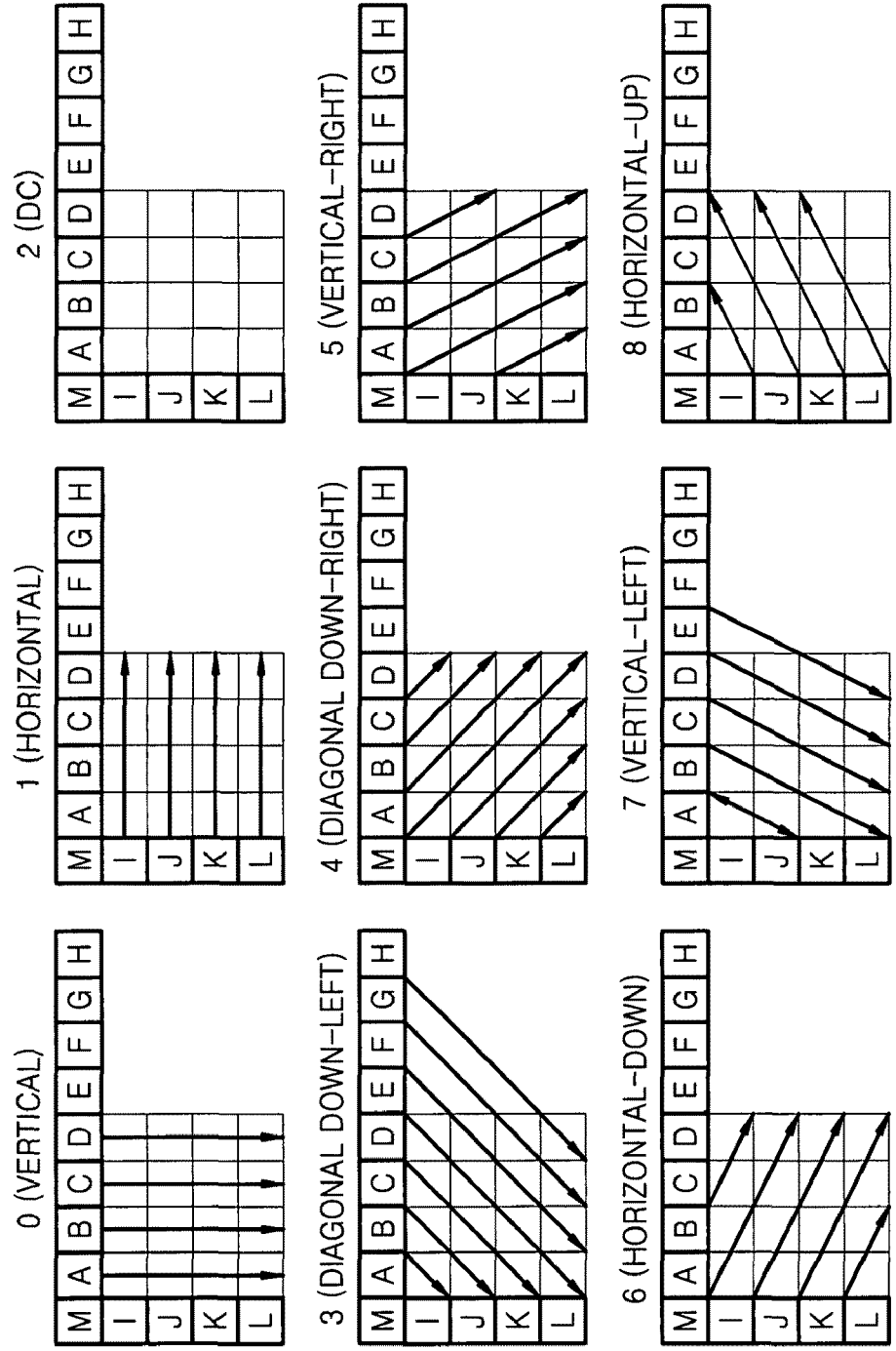
FIG. 5 illustrates a 4×4 intra-prediction mode according to H.264.

The motion estimation unit 302 and the motion compensation unit 304 perform inter-prediction in which a prediction value of the current pixel block of a first color component image is searched for in a preceding or following reference picture. The intra-prediction unit 306 performs intra-prediction in which the prediction value of the current pixel block of the first color component image is searched for in the current picture. For example, referring to FIG. 4 illustrating a 16×16 intra-prediction mode according to H.264 and FIG. 5 illustrating a 4×4 intra-prediction mode according to H.264, the intra-prediction unit 306 selects the first color component image from input R, G, and B color component images and divides the selected first color component image into pixel blocks having a predetermined size. The intra-prediction unit 306 then performs intra-prediction on the pixel blocks of the first color component image in a 16×16 intra-prediction mode, a 4×4 intra-prediction mode, and an 8×8 intra-prediction mode (similar to a 4×4 intra-prediction mode). Inter-prediction and intra-prediction for forming a prediction pixel block of a pixel block of the first color component image are not limited to the above-described example and other inter-prediction and intra-prediction methods may be used.

The subtraction unit 307 generates a first residue by subtracting a prediction pixel block predicted by inter-prediction or intra-prediction from a pixel block of the input first color component image. The generated first residue is transformed into a frequency domain by the transformation unit 308 and is quantized by the quantization unit 309. Transformation coefficients of the quantized first residue are rearranged by the rearrangement unit 310 and then encoded by the entropy-coding unit 314 to be output in the form of a bitstream.

The transformed and quantized first residue is inversely quantized by the inverse quantization unit 312 and is inversely transformed by the inverse transformation unit 313. The addition unit 315 adds the inversely quantized and inversely transformed first residue to the prediction pixel block of the first color component image, thereby reconstructing the pixel block of the first color component image. The reconstructed first color component image passes through the filter 316 that performs deblocking filtering and is stored in the frame memory 317 to be used for inter-prediction of a next picture. The reconstructed pixel block of the first color component image is input to the intra-prediction unit 306 to be used as a reference for intra-prediction of a next pixel block. The reconstructed pixel block of the first color component image is also input to the correlation prediction unit 314 for prediction of pixel blocks of the other color component images except for the first color component image.

The correlation prediction unit 314 predicts a pixel block of corresponding to another color component image from a pixel block of the reconstructed first color component image using a correlation between the color component images of a color image. Referring back to FIGS. 2A and 2B, pixel values of the color component images of the color image have correlation with one another. The correlation prediction unit 314 generates a predictor by modeling correlation between the first color component image and another color component image as a predetermined function and predicts pixel values of another color component image at the same position using the pixel values of a reconstructed pixel block of the first color component image as a parameter with the generated predictor. In particular, the correlation prediction unit 314 according to the exemplary embodiment of the present invention uses a pixel block of a reconstructed neighbor pixel block of the first color component image and pixel values of a reconstructed neighbor pixel block of another color component image when generating the predictor. Such an operation of the correlation prediction unit 314 will be described later in the explanation of modeling.

When the correlation prediction unit 314 predictive-encodes an input image including at least three color components as in an RGB color image, the correlation prediction unit 314 may predict pixel blocks of both of the remaining second and third color component images using a reconstructed pixel block of a first color component image or predict a pixel block of the second color component image from the reconstructed pixel block of the first color component image and a pixel block of the third color component image from the reconstructed pixel block of the second color component image. In other words, the correlation prediction unit 314 may predict pixel blocks of the other color component images from the reconstructed pixel block of the first color component image or predict a pixel block of a color component image from a reconstructed pixel block of another color component image predicted from the reconstructed pixel block of the first color component image.

The subtraction unit 307 subtracts pixel blocks of the original second and third color component images from pixel blocks of the second and third color component images predicted by the correlation prediction unit 314, thereby generating a second residue and a third residue. Like the first residue, the second residue and the third residue are encoded by transformation, quantization, and entropy-coding and are output in the form of a bitstream.

The transformed and quantized second residue and third residue are inversely quantized by the inverse quantization unit 312 and inversely transformed by the inverse transformation unit 313, and the addition unit 315 adds the inversely quantized and inversely transformed second residue and third residue to the pixel blocks of the second and third color component images predicted by the correlation prediction unit 314, thereby reconstructing pixel blocks of the second and third color component images. The reconstructed second and third color component images pass through the filter 316 that performs deblocking filtering and is stored in the frame memory 317 to be used for inter-prediction of a next picture. As mentioned above, when a pixel block of the third color component image is predicted from the reconstructed pixel block of the second color component image, a pixel block of the second color component image reconstructed in the addition unit 315 is input to the correlation prediction unit 314.

The control unit 318 controls components of the image encoding apparatus 300 and determines a prediction mode for the current pixel block. More specifically, the control unit 318 calculates the costs of an inter-predicted image, an intra-predicted image, and an image predicted using a correlation between color component images according to the exemplary embodiment of the present invention and determines a prediction mode at the lowest as a final prediction mode. The control unit 318 may select related art inter-prediction or intra-prediction for encoding each of the color component images instead of predictive encoding according to the present invention if a cost of a predicted image, according to an exemplary embodiment of the present invention, is greater than a predetermined threshold.

The control unit 318 also calculates a reference value indicating correlation between color component images as illustrated in FIGS. 2A and 2B and may select related art inter-prediction or intra-prediction for encoding each of the color component images instead of predictive encoding according to an exemplary embodiment of present invention if the reference value is less than a predetermined threshold. Here, the reference value may be a dispersion value or a standard deviation indicating the degree of dispersion between color component images.

Prediction mode information is inserted into a header of a bitstream of an image encoded by an image encoding method according to an exemplary embodiment of the present invention to perform decoding based on correlation between color component images according to the exemplary embodiment of the present invention.

Figure 6:
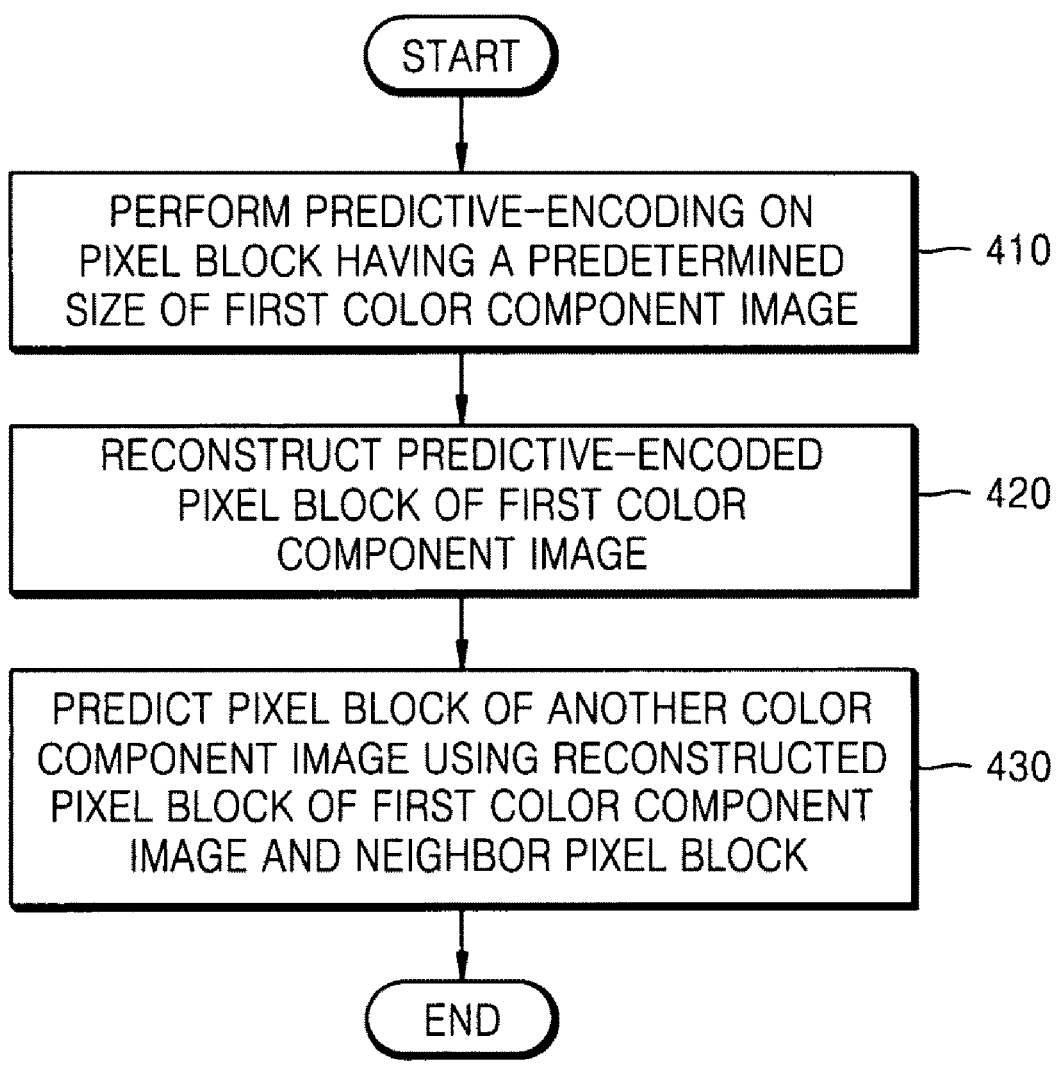
FIG. 6 is a flowchart illustrating an image encoding method according to an exemplary embodiment of the present invention.

FIG. 6 is a flowchart illustrating an image encoding method according to an exemplary embodiment of the present invention. Hereinafter, the operation of the image encoding apparatus 300 and the image encoding method according to an exemplary embodiment of the present invention will be described with reference to FIGS. 3 and 4.

In operation 410, predictive encoding is performed on a pixel block having a predetermined size of a first color component image selected from a plurality of color component images of an input color image. As mentioned above, the predictive encoding is performed by inter-prediction of the motion estimation unit 302 and the motion compensation unit 304 or intra-prediction of the intra-prediction unit 306.

FIG. 7A illustrates a 16×16 pixel block 710 of a G color component image included in an input image, FIG. 7B illustrates a 16×16 pixel block 720 of a B color component image included in the input image, and FIG. 7C illustrates a 16×16 pixel block 730 of a R color component image included in the input image. $g_{i,j}$, $b_{i,j}$, and $r_{i,j}$ indicate pixel values in an $i^{th}$ row and a $j^{th}$ column of a 16×16 pixel block of each of the G, B, and R color component images. In FIGS. 7A through 7C, hatched pixels indicate reconstructed pixels of a neighbor pixel block processed prior to the current pixel block.

When the G color component image, the B color component image, and the R color component image are sequentially encoded, a prediction pixel block of a 16×16 pixel block of the G color component image is generated by inter-prediction of the motion estimation unit 302 and the motion compensation unit 304 or intra-prediction of the intra-prediction unit 306.

The subtraction unit 307 calculates a first residue by calculating a difference between the prediction pixel block of the 16×16 pixel block of the G color component image and the 16×16 pixel block of the original G color component image. The generated first residue passes through transformation, quantization, and entropy-encoding and is then output as a bitstream.

In operation 420, inverse quantization and inverse transformation are performed on the first residue and the inversely quantized and inversely transformed first residue is added to the prediction pixel block of the 16×16 pixel block of the G color component image in order to reconstruct the 16×16 pixel block of the G color component image.

In operation 430, the correlation prediction unit 314 predicts pixel values of a pixel block of the B color component image and pixel values of a pixel block of the R color component image at corresponding positions using pixel values of a reconstructed neighbor pixel block of the G color component image, pixel values of reconstructed neighbor pixel blocks of the B and R color component images, and pixel values of the reconstructed current pixel block of the G color component image.

If a pixel value of a pixel in an $i^{th}$ row and a $j^{th}$ column of the reconstructed 16×16 pixel block of the G color component image is $g'_{i,j}$ and a prediction value, which corresponds to $g'_{i,j}$, of a pixel in an $i^{th}$ row and a $j^{th}$ column of a pixel block of the B color component image is $\overline{b_{i,j}}$, the pixel block of the B color component image can be predicted using pixel values $g'_{-1,0}$, $g'_{-1,-1}, \ldots, g'_{-1,15}, g'_{0,-1}, g'_{1,-1}, \ldots, g'_{15,-1}$ of a reconstructed neighbor pixel block of the G color component image, pixel values $b'_{-1,0}, \ldots, b'_{-1,15}, b'_{0,-1}, \ldots, b'_{15,-1}$ of a reconstructed neighbor pixel block of the B color component image, and pixel values $g'_{i,j}$ of the reconstructed current pixel block of the G color component image as follows:

$$\overline{b_{i,j}} = f(g'_{i,j}, g'_{-1,0}, g'_{-1,1}, \ldots, g'_{-1,15}, g'_{0,-1}, g'_{1,-1}, \ldots, g'_{15,-1}, b'_{-1,0}, \ldots, b'_{-1,15}, b'_{0,-1}, \ldots, b'_{15,-1}) \quad (1)$$

where a function f may be defined variously. For example, the relationship between the pixel value $g'_{i,j}$ of the reconstructed current pixel block of the G color component image and the prediction value $\overline{b_{i,j}}$, which corresponds to $g'_{i,j}$, of the current pixel block of the B color component image can be defined as a first order function as follows:

$$\overline{b_{i,j}} = a \times g'_{i,j} + b \quad (2)$$

where a indicates a predetermined weight indicating correlation between the G color component image and the B color component image and b indicates a predetermined offset value. Prediction pixel values obtained by Equation 2 are clipped to integers between 0 and 255 when a pixel value of an image is expressed in 8 bits.

Values a and b in Equation 2 may change according to the position (i, j) of a pixel, but they are assumed to be constant within a predetermined block in the current exemplary embodiment of the present invention. For example, a and b are determined as values that minimize differences between prediction pixel values of a neighbor pixel block of the second color component image predicted using pixel values of a reconstructed neighbor pixel block of the first color component image and pixel values of a reconstructed neighbor pixel block of the second color component image. In other words, when the first color component image is the G color component image and another color component image is the B color component image, a and b may be determined as values that minimize a sum of differences between pixel values $b'_{i,j}$ of a reconstructed neighbor pixel block of the B color component image and corresponding prediction pixel values $\overline{b_{i,j}}$ of the neighbor pixel block of the B color component image predicted using Equation 2 as follows:

$$(a, b) = \arg\min_{a, b} \sum_{i=0}^{15} |b_{-1,j} - (a \cdot g'_{-1,j} + b)| + \sum_{j=-1}^{15} |b_{j,-1} - (a \cdot g'_{j,-1} + b)| \quad (3)$$

To determine a and b in Equation 2, a may be determined as 1 and b may be determined as the average of differences between pixel values of a reconstructed neighbor pixel block of the B color component image and pixel values of a reconstructed neighbor pixel block of the G color component image as follows:

$$b = \frac{\sum_{i=0}^{15}(b'_{-1,i} - g'_{-1,i}) + \sum_{j=0}^{15}(b'_{j,-1} - g'_{j,-1})}{32} \quad (4)$$

Once a and b in Equation 2 are determined, the correlation prediction unit 314 substitutes pixel values $g'_{i,j}$ of a pixel block of the reconstructed G color component image into Equation 2 in order to predict corresponding pixel values of a pixel block of the B color component image.

To determine a and b in Equation 2, a linear regression model based method that is widely used in the field of statistics may be used.

Figure 8A:
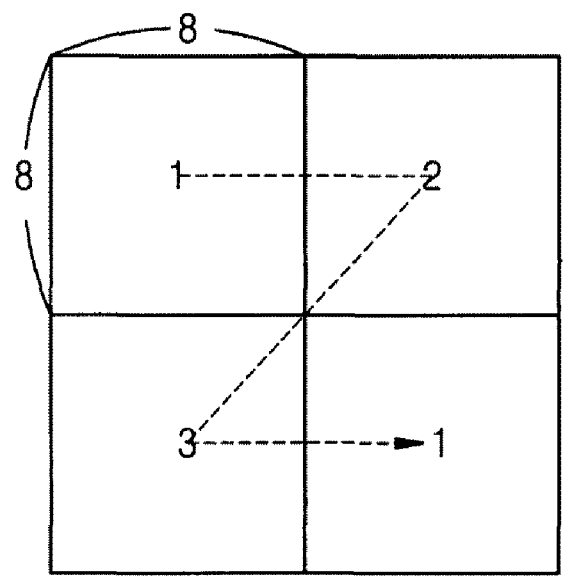
FIG. 8A illustrates the processing order of 8×8 pixel blocks in an image encoding method and method according to the present invention.
Figure 8B:
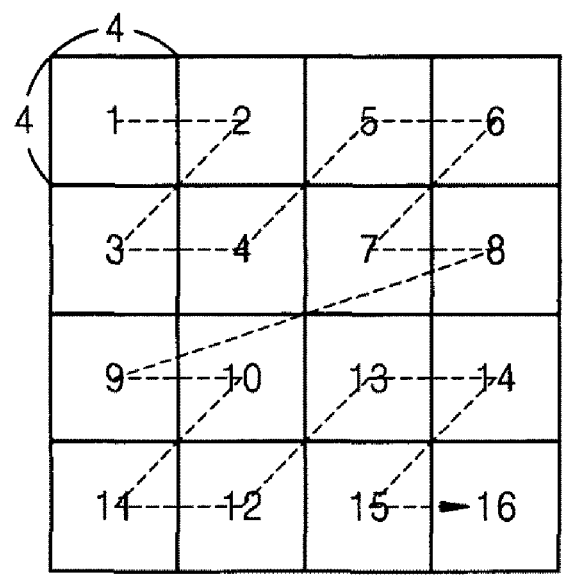
FIG. 8B illustrates the processing order of 4×4 pixel blocks in an image encoding method and apparatus according to the present invention.

FIG. 8A illustrates the processing order of 8×8 pixel blocks in an image encoding method and apparatus according to an exemplary embodiment of the present invention, and FIG. 8B illustrates the processing order of 4×4 pixel blocks in an image encoding method and apparatus according to the exemplary embodiment of the present invention Referring to FIG. 8A, when a pixel block of the B color component image is processed in an 8×8 mode, four 8×8 pixel blocks of the B color component image are sequentially predicted left-to-right and top-to-bottom. Pixel values of the 8×8 pixel blocks of the B color component image are predicted using Equation 2 in the similar manner to above-described prediction of pixel values of a 16×16 pixel block of the B color component image. In processing in the 8×8 mode, a and b of Equation 2 may be determined as values that minimize a sum of differences between pixel values of a reconstructed neighbor pixel block of the B color component image and corresponding prediction pixel values of a neighbor pixel block of the B color component image or a may be determined as 1 and b may be determined as the average of differences between pixel values of a reconstructed 8×8 neighbor pixel block of the B color component image and pixel values of a reconstructed 8×8 neighbor pixel block of the G color component image as follows:

$$b = \frac{\sum_{i=0}^{7}(b'_{-1,i} - g'_{-1,i}) + \sum_{j=0}^{7}(b'_{j,-1} - g'_{j,-1})}{16} \quad (5)$$

Referring to FIG. 8B, when a pixel block of the B color component image is processed in a 4×4 mode, sixteen 4×4 pixel blocks of the B color component image are sequentially predicted left-to-right and top-to-bottom. Pixel values of the 4×4 pixel blocks of the B color component image can be predicted using Equation 2 in the similar manner to above-described prediction of pixel values of a 16×16 pixel block or 8×8 pixel block of the B color component image.

a and b of Equation 2 may be determined as values that minimize a sum of differences between pixel values of a reconstructed 4×4 neighbor pixel block of the B color component image and corresponding prediction pixel values of a neighbor pixel block of the B color component image or a may be determined as 1 and b may be determined as the average of differences between pixel values of a reconstructed 8×8 neighbor pixel block of the B color component image and pixel values of a reconstructed 8×8 neighbor pixel block of the G color component image as follows:

$$b = \frac{\sum_{i=0}^{3}(b'_{-1,i} - g'_{-1,i}) + \sum_{j=0}^{3}(b'_{j,-1} - g'_{j,-1})}{8} \quad (6)$$

As mentioned above, correlation prediction for macroblock(16×16) may be performed in units of a 16×16 block, an 8×8 block, or a 4×4 block. As an adaptive example, correlation prediction for each macroblock may be performed in units of a block in one of the three block modes.

The subtraction unit 307 calculates a difference between a pixel block of the original B color component image and a prediction pixel block predicted by the correlation prediction unit 314 using pixel values of a reconstructed pixel block of the G color component image, thereby generating a second residue. The generated second residue passes through transformation, quantization, and entropy-encoding and is output in the form of a bitstream.

Like the pixel values of the pixel block of the B color component image, pixel values of a pixel block of the R color component image can also be predicted using pixel values of a reconstructed pixel block of the G color component image.

The correlation prediction unit 314 may predict pixel values of a pixel block of the R color component image using pixel values of a reconstructed pixel block of the previously processed B color component image instead of pixel values of the reconstructed G color component image. In other words, the transformed and quantized value of the second residue that is a difference between the pixel block of the original B color component image and a prediction pixel block of the B color component image is inversely transformed and inversely quantized, and the pixel block of the B color component image reconstructed by adding the inversely transformed and inversely quantized second residue and the prediction pixel block of the B color component image may be used for prediction of a pixel block of the R color component image.

More specifically, when a pixel value of a pixel in an $i^{th}$ row and a $j^{th}$ column of a reconstructed pixel block of the B color component image is $b'_{i,j}$, a prediction value, which corresponds to $b'_{i,j}$, of a pixel in an $i^{th}$ row and a $j^{th}$ column of a pixel block of the R color component image is $\overline{r_{i,j}}$, and a predetermined weight indicating a correlation between the B color component image and the R color component image is c, and a predetermined offset value is d, the correlation prediction unit 314 models a correlation between the B color component image and the R color component image as a first-order function as follows, thereby predicting pixel values of the R color component image, which correspond to pixel values of the B color component image.

$$\overline{r_{i,j}} = c \times b'_{i,j} + d \quad (7)$$

As mentioned above, prediction pixel values obtained using Equation 7 are clipped to integers between 0 and 255 when a pixel value of an image is expressed in 8 bits. c and d may be determined using pixel values of a reconstructed neighbor pixel block of the B color component image and pixel values of a reconstructed neighbor pixel block of the R color component image in the similar manner to determination of a and b.

Once the constants c and d of Equation 7 are determined, the correlation prediction unit 314 substitutes pixel values of a reconstructed pixel block of the B color component image into Equation 6 to predict corresponding pixel values of a pixel block of the R color component image.

Values a and b of Equation 2 and c and d of Equation 7 may be inserted as prediction mode information into a header of a generated bitstream and transmitted to a decoding stage to be used for decoding. However, since an image decoding apparatus can also generate a, b, c, and d using reconstructed neighbor pixels of each color component in the same way to an image encoding apparatus, a, b, c, and d may be generated by the image decoding apparatus without insertion of a, b, c, and d into a bitstream.

Figure 9:
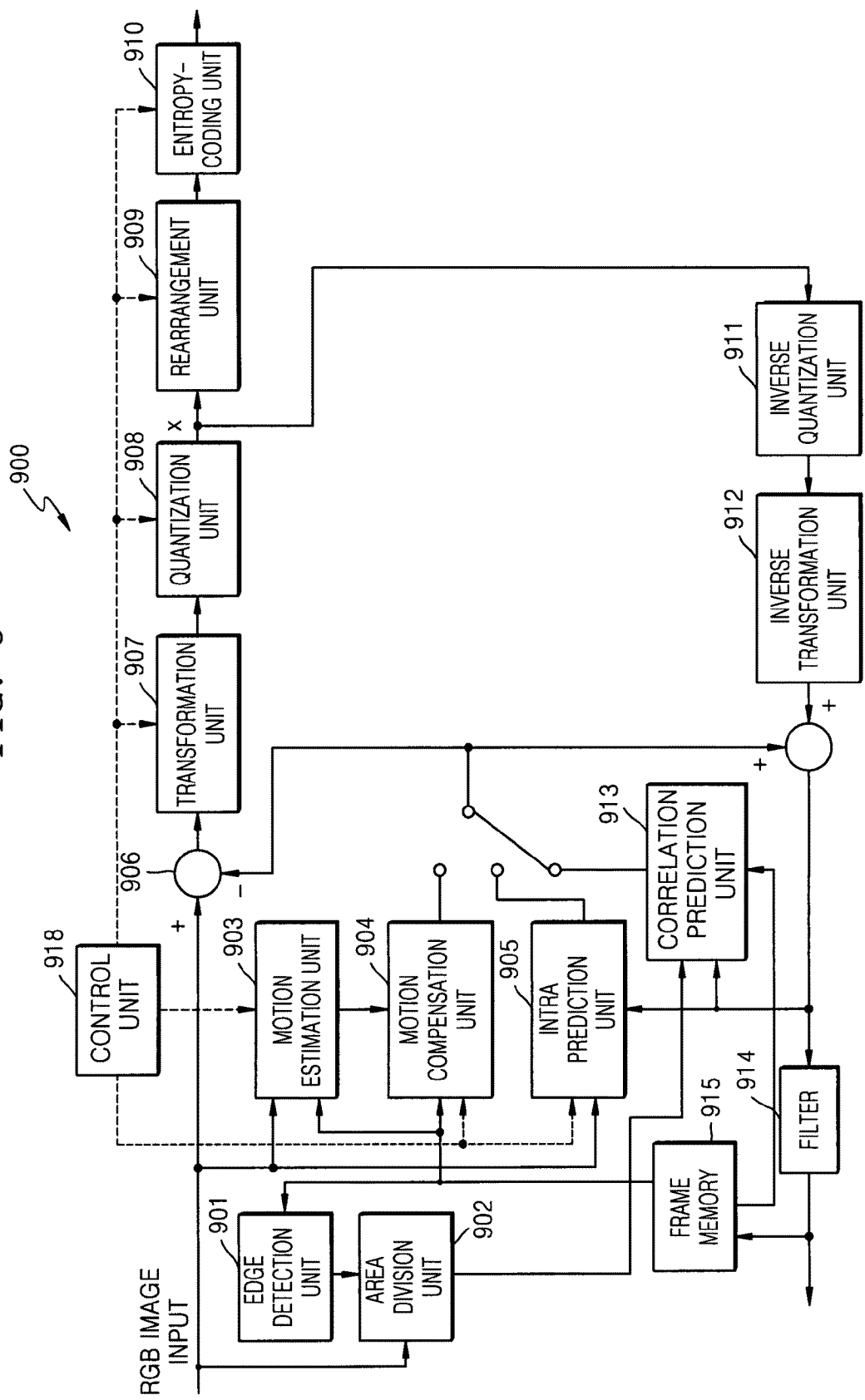
FIG. 9 is a block diagram of an image encoding apparatus according to another exemplary embodiment of the present invention.
Figure 10:
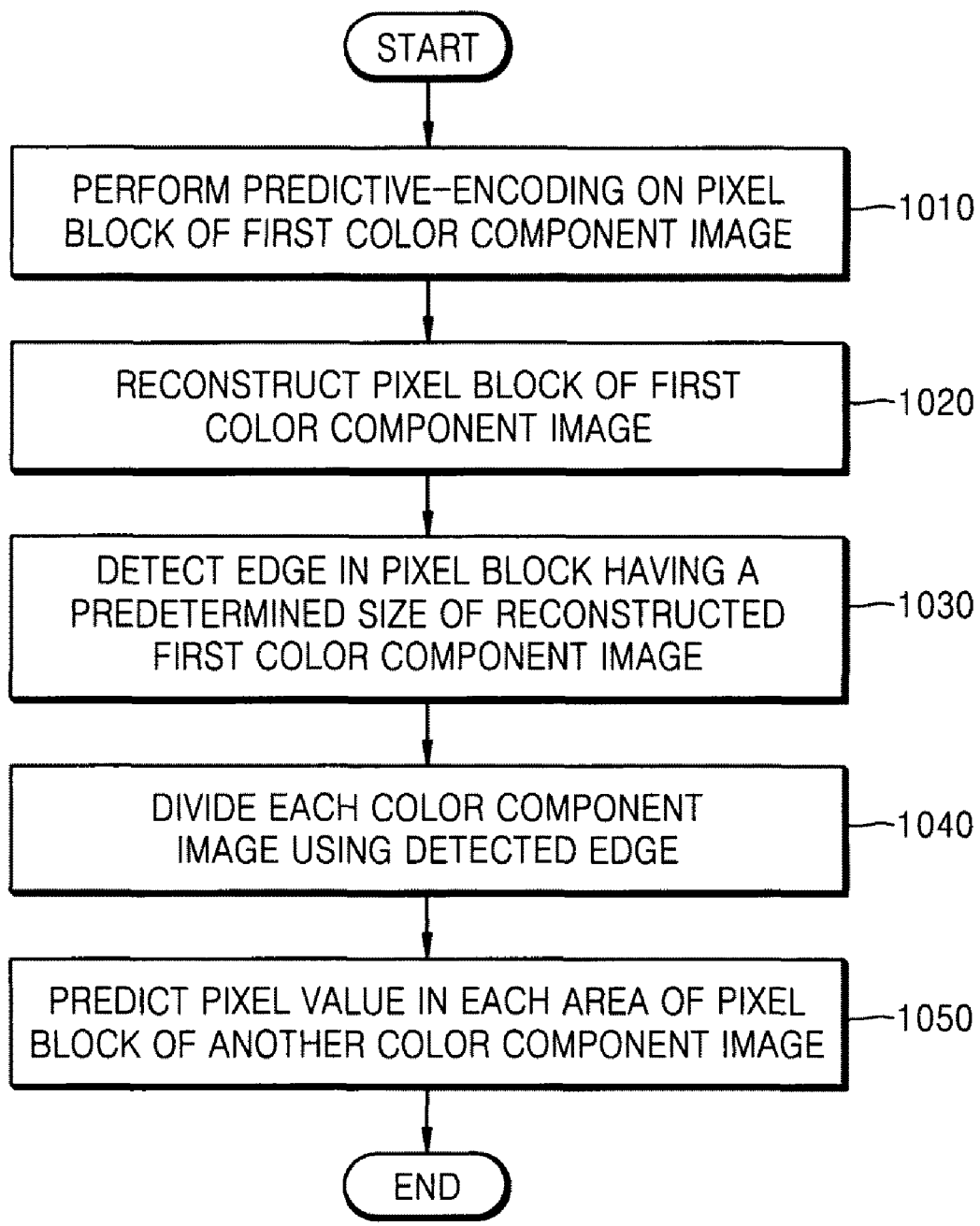
FIG. 10 is a flowchart illustrating an image encoding method according to another exemplary embodiment of the present invention.

FIG. 9 is a block diagram of an image encoding apparatus 900 according to another exemplary embodiment of the present invention and FIG. 10 is a flowchart illustrating an image encoding method according to another exemplary embodiment of the present invention.

The structure and operation of the image encoding apparatus 900 according to another exemplary embodiment of the present invention are similar to those of the image encoding apparatus 300 illustrated in FIG. 3, but the image encoding apparatus 900 further includes an edge detection unit 901 for detecting an edge in the reconstructed first color component image and an area division unit 902. In the following description, the same components of the image encoding apparatus 900 as those of the image encoding apparatus 300 will not be described and explanation of the image encoding apparatus 900 and the image encoding method according to another exemplary embodiment of the present invention will be focused on differences from the image encoding apparatus 300 according to an exemplary embodiment of the present invention.

In operation 1010, a prediction pixel block of a pixel block of the G color component image is generated by motion estimation/compensation of a motion estimation unit 903 and a motion compensation unit 904 or intra-prediction of the intra-prediction unit 905. A first residue that is a difference between the prediction pixel block of the G color component image and the original pixel block of the G color component image is encoded by transformation, quantization, and entropy-encoding and is output as a bitstream.

In operation 1020, inverse transformation and inverse quantization are performed on the transformed and quantized first residue, thereby reconstructing the first residue. The reconstructed first residue is added to the prediction pixel block of the G color component image, thereby reconstructing the pixel block of the G color component image.

In operation 1030, the edge detection unit 901 detects an edge in a reconstructed pixel block having a predetermined size of the first color component image. This is because color characteristics may change between areas divided by an edge within a pixel block. Thus, in the another exemplary embodiment of the present invention, an edge in a pixel block is detected, a pixel block is divided by the detected edge into areas, and pixel values in each area of another color component image is predicted from pixel values of the reconstructed first color component in a similar manner as in the foregoing exemplary embodiment of the present invention.

For edge detection, various edge detection algorithms like a sobel operator or canny edge detection may be used. The direction of an intra-prediction mode determined by the intra-prediction unit 905 may be determined as an edge direction without a need for the edge detection unit 901.

In operation 1040, the area division unit 902 divides a pixel block of the first color component image and a corresponding pixel block of another color component image using the detected edge.

Figure 11A:
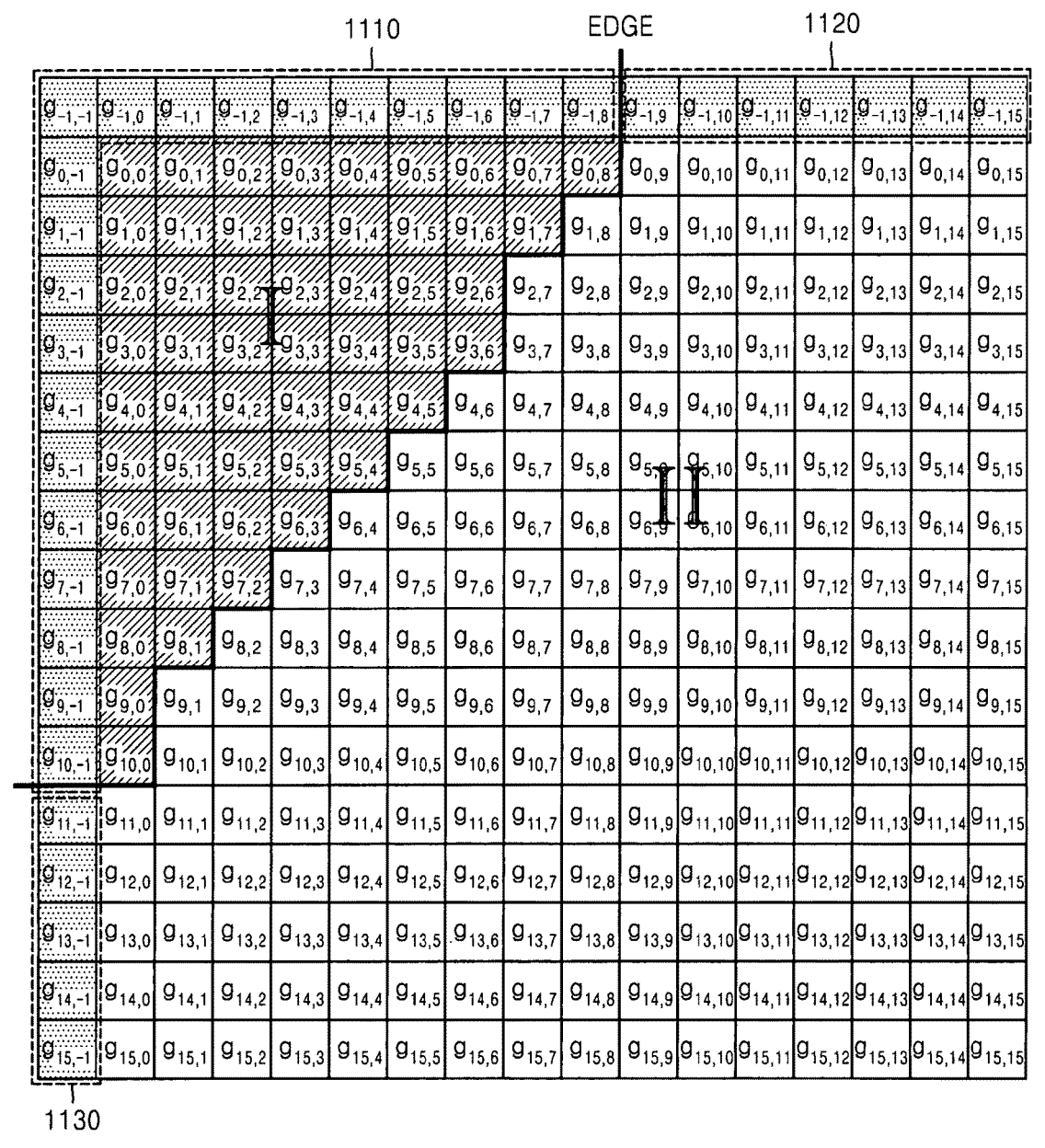
Figure 11B:
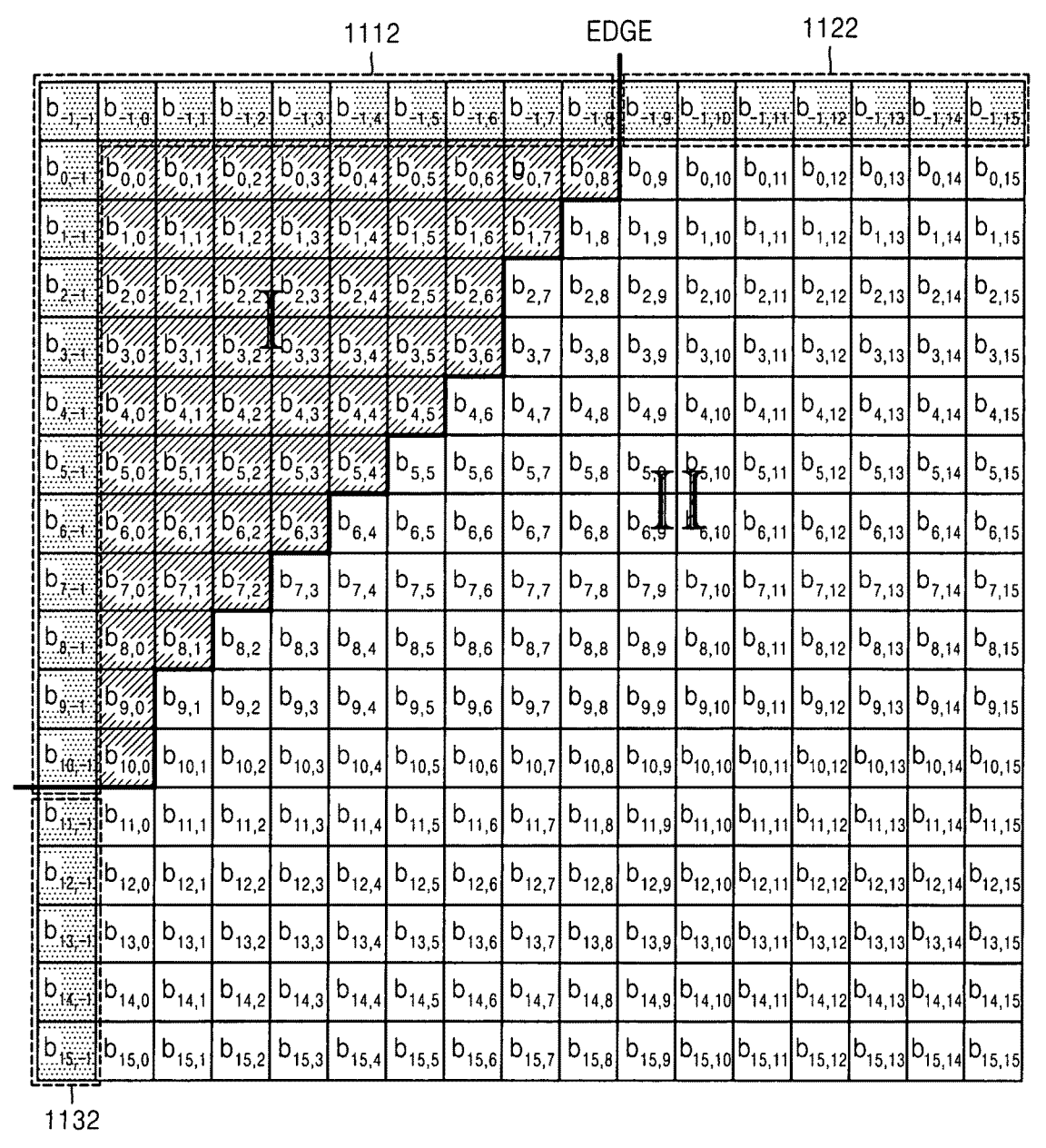
Figure 11C:
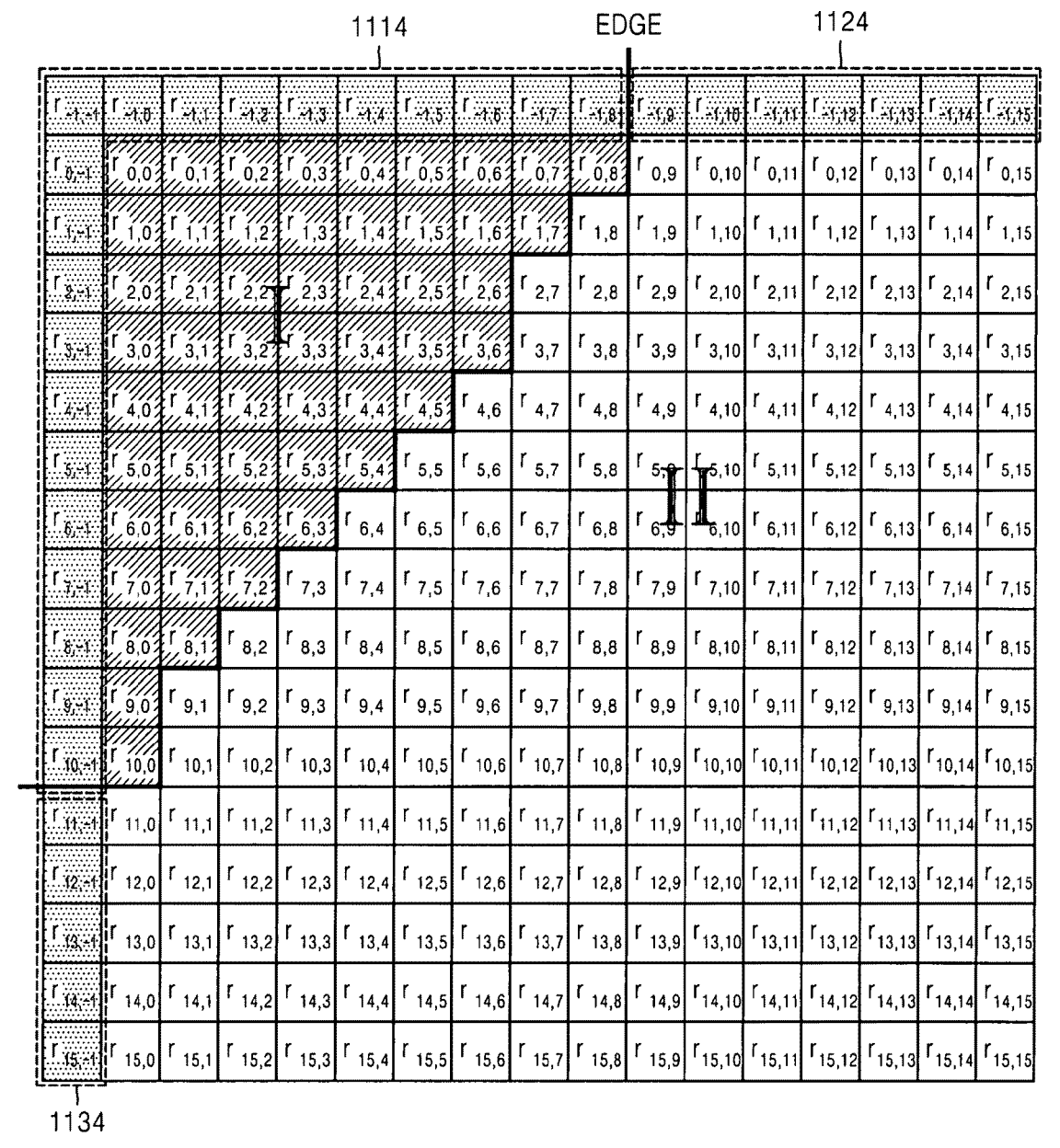

FIG. 11A illustrates an example in which a pixel block of the G color component image is divided using a detected edge, FIG. 11B illustrates an example in which a pixel block of the B color component image is divided using a detected edge, and FIG. 11C illustrates an example in which a pixel block of the R color component image is divided using a detected edge. Referring to FIGS. 11A through 11C, if the edge detection unit 901 detects an edge in a reconstructed pixel block of the G color component image, the area division unit 902 determines that the same edge exists in a pixel block of the B color component image and a pixel block of the R color component image and divides the pixel block of each color component image into two areas I and II using the detected edge.

In operation 1050, the correlation prediction unit 913 predicts pixel values in each of the areas I and II of the B color component image and pixel values of the R color component image using a corresponding reconstructed pixel block of the G color component image. In other words, the correlation prediction unit 913 predicts pixel values in the first area I of a pixel block of the B color component image and pixel values in the first area I of a pixel block of the R color component image using pixel values $g'_{i,j}$ in the first area I of the reconstructed G color component. Similarly, the correlation prediction unit 913 predicts pixel values in the second area II of a pixel block of the B color component image and pixel values in the second area II of a pixel block of the R color component image using pixel values $g'_{i,j}$ in the second area II of the reconstructed G color component image.

More specifically, if a pixel block of each color component image is divided into n areas, a pixel value in a $k^{th}$ area (k=1, 2, . . . , n) of a reconstructed pixel block of the G color component image is $g_{(k)}{'}_{i,j}$, a prediction pixel value, which corresponds to $g_{(k)}{'}_{i,j}$, of a pixel in a $k^{th}$ area of a pixel block of the B color component image, is $\overline{b_{(k)i,j}}$, a predetermined weight indicating a correlation between the $k^{th}$ area of the G color component image and the $k^{th}$ area of the B color component is e, and a predetermined offset value is f, pixel values of a pixel block of the B color component image can be predicted as using Equation 2 as follows:

$$\overline{b_{(k)i,j}} = e \times g'_{(k)i,j} + f \qquad (8)$$

where the constants e and f may be determined as values that minimize differences between prediction pixel values of a neighbor pixel block of the second component color image adjacent to the $k^{th}$ area of the pixel block of the second color component image predicted using pixel values of a reconstructed neighbor pixel block of the first color component image and pixel values of a reconstructed neighbor pixel block of the second color component image adjacent to the $k^{th}$ area of the pixel block of the second color component image.

For example, e may be determined as 1 and f may be determined using the average of differences between pixel values of a reconstructed neighbor pixel block of the second color component image adjacent to the $k^{th}$ area of the pixel block of the second color component image and pixel values of a reconstructed neighbor pixel block of the first color component image adjacent to the $k^{th}$ area of the pixel block of the second color component image. Referring to FIGS. 11A and 11B, when the first color component image is the G color component image and the second color component image is the B color component image, f of Equation 9 to be applied to the first area I can be defined using pixel values of pixels 1110 of a reconstructed neighbor pixel block of the G color component image adjacent to the first area I of the current pixel block and pixel values of corresponding pixels 1112 of a reconstructed neighbor pixel block of the B color component image, as follows:

$$f = \frac{\sum_{i=-1}^{8}(b'_{-1,i} - g'_{-1,i}) + \sum_{j=0}^{10}(b'_{j,-1} - g'_{j,-1})}{21} \qquad (9)$$

Similarly, f of Equation 8 to be applied to the second area II can be defined using pixel values of pixels 1120 and 1130 of a reconstructed neighbor pixel block of the G color component image adjacent to the second area II of the current pixel block and pixel values of corresponding pixels 1122 and 1132 of a reconstructed neighbor pixel block of the B color component image, as follows:

$$f = \frac{\sum_{i=9}^{15}(b'_{-1,i} - g'_{-1,i}) + \sum_{j=11}^{15}(b'_{j,-1} - g'_{j,-1})}{12} \qquad (10)$$

Like prediction of pixel values in each of the first area I and the second area II of a pixel block of the B color component image, pixel values in each of the first area I and the second area II of a pixel block of the R color component image can also be predicted.

When pixel values of a pixel block of the R color component image are predicted, pixel values of a reconstructed pixel block of the B color component image in the same area, instead of pixel values of a reconstructed pixel block of the G color component image, may be used like in Equation 7.

Figure 12:
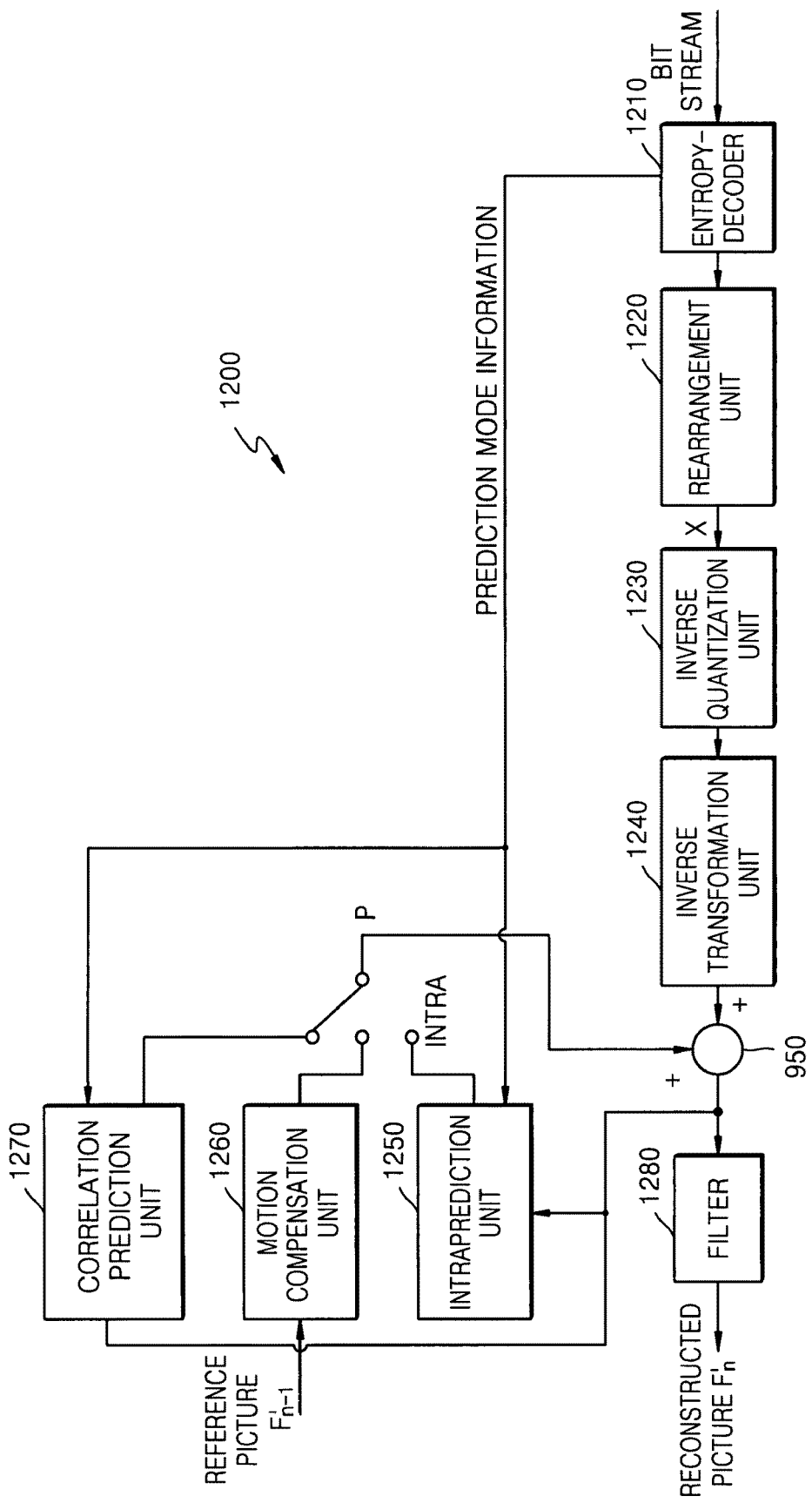
FIG. 12 is a block diagram of an image decoding apparatus according to an exemplary embodiment of the present invention.

FIG. 12 is a block diagram of an image decoding apparatus 1200 according to an exemplary embodiment of the present invention.

Referring to FIG. 12, the image decoding apparatus 1200 includes an entropy-decoding unit 1210, a rearrangement unit 1220, an inverse quantization unit 1230, an inverse transformation unit 1240, an intra-prediction unit 1250, a motion compensation unit 1260, a correlation prediction unit 1270, and a filter 1280.

The entropy-decoding unit 1210 and the rearrangement unit 1220 receive a compressed bitstream and perform entropy-decoding, thereby generating a quantized coefficient. The inverse quantization unit 1230 and the inverse transformation unit 1240 perform inverse quantization and inverse transformation on the quantized coefficient in order to extract residue information, motion vector information, and prediction mode information for each color component image. Here, the prediction mode information may include a predetermined syntax indicating whether the compressed bitstream is a bitstream encoded according to an exemplary embodiment of the present invention. If the compressed bitstream is encoded according to an exemplary embodiment of the present invention, the prediction mode information may include predictor information used for prediction of pixel values of a pixel block of other color component images. For example, the prediction mode information may include a and b of Equation 2, c and d of Equation 7, and e and f of Equation 8.

If the current pixel block is an inter-predicted pixel block, the motion compensation unit 1260 generates a prediction pixel block of the current pixel block by motion compensation and estimation. If the current pixel block is an intra-predicted pixel block, the intra-prediction unit 1250 generates a prediction pixel block of the current pixel block by performing intra prediction.

The addition unit 1275 adds the prediction pixel block of the first color component image and a first residue output from the inverse transformation unit 1240 in order to decode a pixel block of the first color component image.

The decoded pixel block of the first color component image is input to the correlation prediction unit 1270. The correlation prediction unit 1270 decodes a corresponding pixel block of another color component image using the decoded pixel block of the first color component image.

More specifically, like the correlation prediction unit 314 of FIG. 3, correlation prediction unit 1270 substitutes pixel values of the decoded pixel block of the first color component image into Equation 2, thereby predicting pixel values of a pixel block of a second or third color component image. If the third color component image is predicted using the reconstructed second color component image, pixel values of a pixel block of the third color component image can be predicted using pixel values of a reconstructed pixel block of the color component image like in Equation 7.

By adding a second residue and a third residue output from the inverse transformation unit 1240 to prediction pixel blocks of the second color component image and the third color component image predicted by the correlation prediction unit 1270, a pixel block of the second color component image and a pixel block of the third color component image are decoded.

When an edge in each area of a pixel block is detected and an encoded bitstream are encoded according to another exemplary embodiment of the present invention, the image decoding apparatus 1200 may further include an edge detection unit (not shown) that detects an edge in a pixel block of a first color component image from a received bitstream including a plurality of encoded color component images and an area division unit (not shown) that divides a pixel block of each of the color component images using the detected edge. In this case, like the correlation prediction unit 913 of FIG. 9, the correlation prediction unit 1270 predicts pixel values in each area of corresponding pixel blocks of the B color component image and the R color component image using a decoded pixel block of the G color component image. As mentioned above, constants of a predictor used for prediction of pixel values of other color component images may be determined using pixel values of a reconstructed neighbor pixel block or prediction mode information included in the bitstream.

Figure 13:
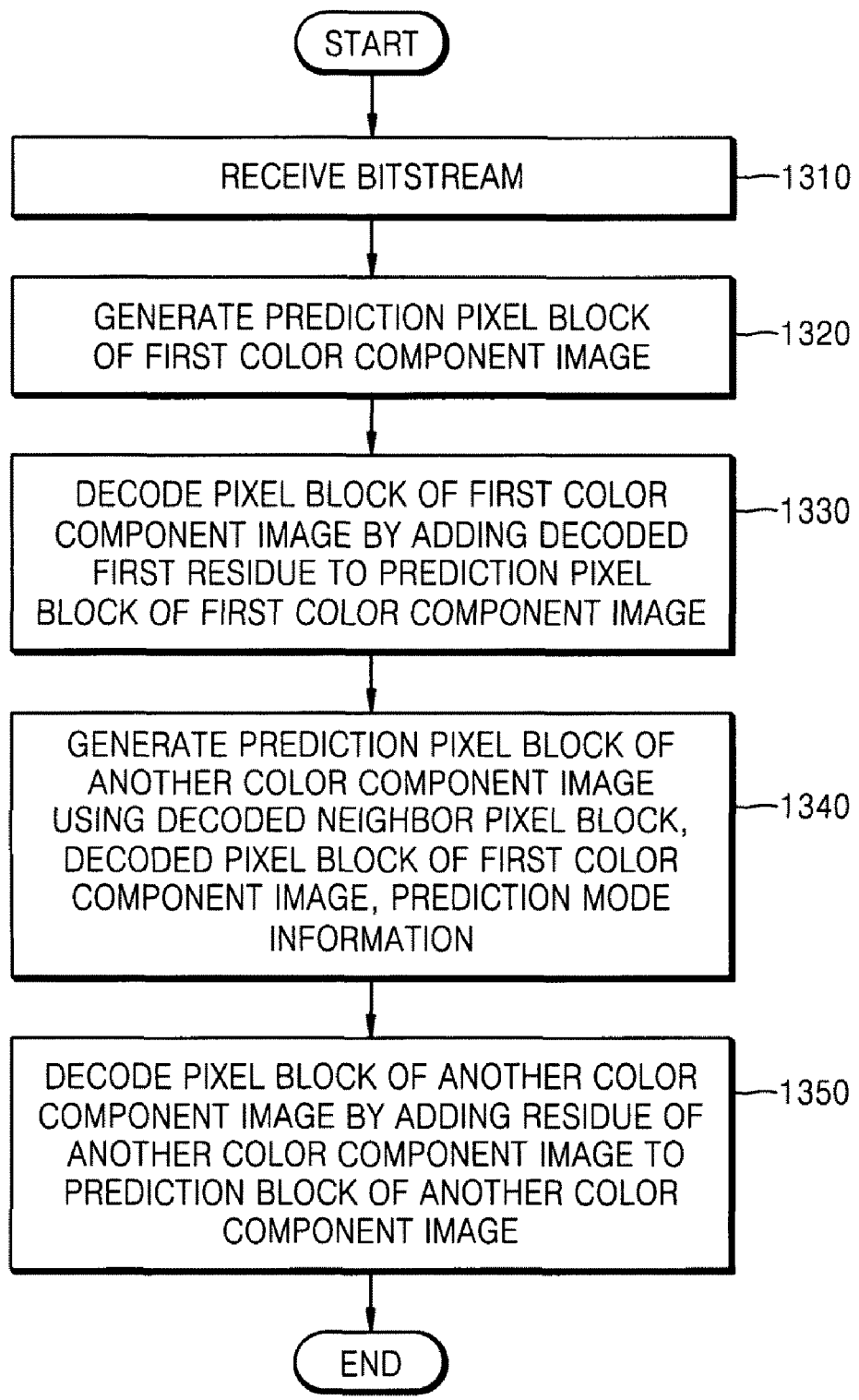
FIG. 13 is a flowchart illustrating an image decoding method according to an exemplary embodiment of the present invention.

FIG. 13 is a flowchart illustrating an image decoding method according to an exemplary embodiment of the present invention.

Referring to FIG. 13, a bitstream including at least two encoded color component images is received in operation 1310.

A prediction pixel block of a pixel block having a predetermined size of a first color component image among a plurality of color component images included in the bitstream is generated in operation 1320 and the prediction pixel block of the first color component image is added by a first residue in order to decode the pixel block of the first color component image in operation 1330.

In operation 1340, pixel values of a pixel block of another color component image is predicted using the decoded pixel block of the first color component image, a decoded neighbor pixel block of the first color component image, and a decoded neighbor pixel block of the another color component image, thereby generating a prediction pixel block of a pixel block of the another color component image. As mentioned above, to generate a predictor like in Equation 2 or 7 used for prediction of a pixel block of the another color component image, prediction mode information included in the bitstream or a decoded neighbor pixel block of the first color component image and a decoded neighbor pixel block of another color component image to be decoded may be used. The correlation prediction unit 1270 predicts pixel values of pixel blocks of the second color component image and the third color component image using pixel values of the decoded pixel block of the first color component image or predicts pixel values of the decoded pixel block of the third color component image using a second color component image.

In operation 1350, an inversely transformed second residue and an inversely transformed third residue are added to prediction pixel blocks of the pixel blocks of the second color component image and the third color component image, thereby decoding pixel blocks of the second color component image and the third color component image.

Figure 14:
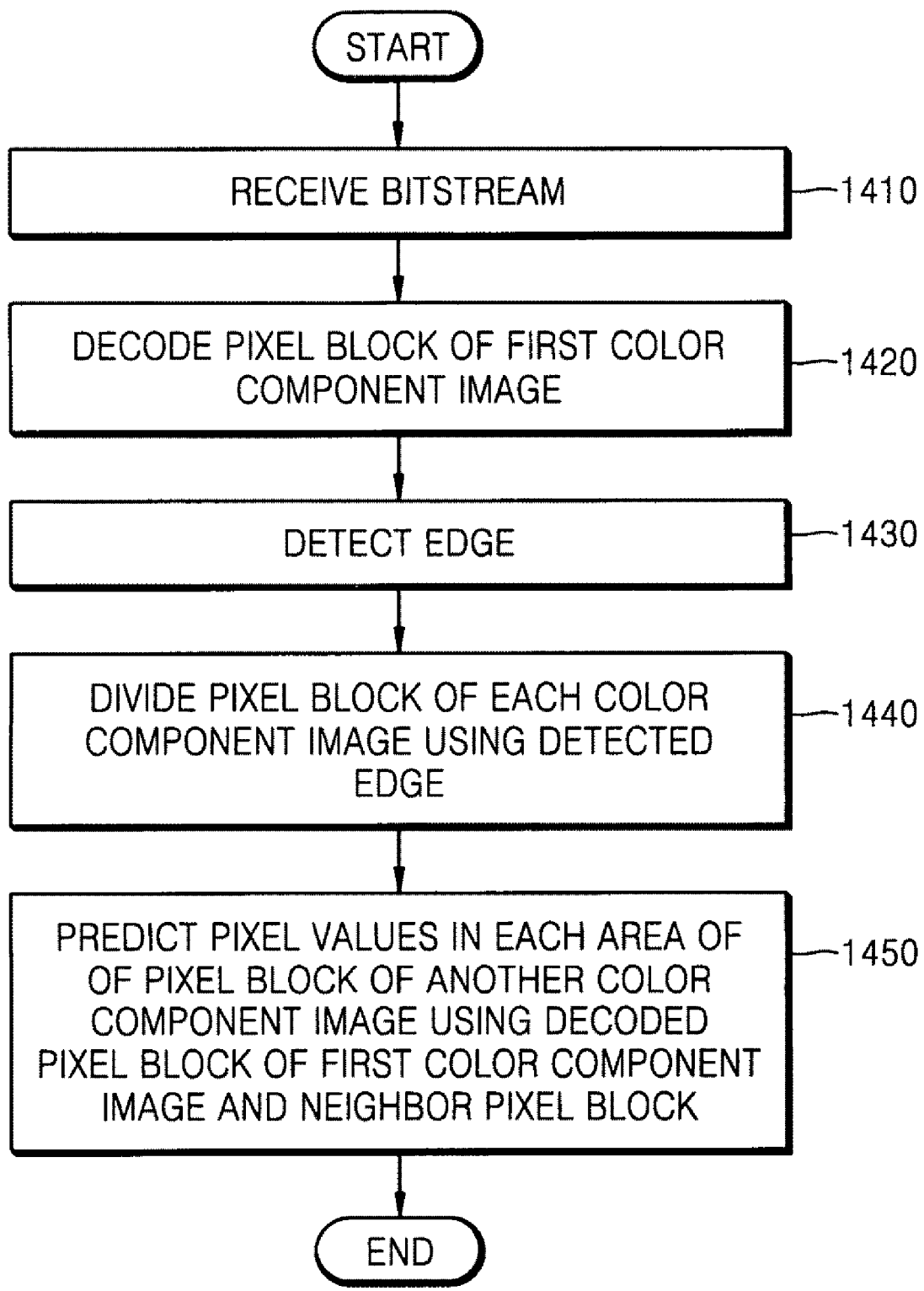
FIG. 14 is a flowchart illustrating an image decoding method according to another exemplary embodiment of the present invention.

FIG. 14 is a flowchart illustrating an image decoding method according to another exemplary embodiment of the present invention. The image decoding method according to another exemplary embodiment of the present invention is similar to that according to the foregoing exemplary embodiment of the present invention, except that each area in pixel blocks of color component images, wherein the areas are divided by an edge in each of the pixel blocks, is decoded.

Referring to FIG. 14, a bitstream including at least two encoded color component images is received in operation 1410.

In operation 1420, a pixel block having a predetermined size of a first color component image among the color component images is decoded.

In operation 1430, an edge in the decoded pixel block of the first color component image is detected.

In operation 1440, the decoded pixel block of the first color component image and corresponding pixel blocks of the other color component images are divided using the detected edge.

In operation 1450, pixel values in each area of the pixel blocks of the second color component image and the second color component image are predicted using the decoded pixel block of the first color component image.

The pixel values in each area of the second color component image or the third color component image predicted are combined to form prediction pixel blocks of the second color component image or the third color component image. The prediction pixel blocks are added to inversely transformed second residue and third residue, thereby decoding pixel blocks of the second color component image and the third color component image.

The present invention can also be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices, and carrier waves. The computer-readable recording medium can also be distributed over a network of coupled computer systems so that the computer-readable code is stored and executed in a decentralized fashion.

As described above, according to an exemplary embodiment of the present invention, predictive encoding is performed using a correlation between a plurality of color component images forming a single image, thereby improving encoding efficiency.

Moreover, according to an exemplary embodiment of the present invention, encoding is performed on an RGB input image in an RGB domain without transformation into a YUV domain, thereby preventing color distortion during transformation of the RGB image into another color format and thus improving display quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image decoding method comprising:
    (a) receiving a bitstream of an encoded image including a plurality of color component images;
    (b) decoding a pixel block having a predetermined size of a first color component image among the color component images; and
    (c) decoding a corresponding pixel block of a second color component image using pixel values of a decoded neighbor pixel block of the previously processed first color component image, pixel values of a decoded neighbor pixel block of the second color component image, and pixel values of the decoded pixel block of the first color component image.

2. The image decoding method of claim 1, wherein the encoded image comprises a red (R) color component image, a green (G) color component image, and a blue (B) color component image.

3. The image decoding method of claim 1, wherein (c) comprises:
    (c1) extracting a predetermined weight a indicating a correlation between the first color component image and the second color component image and a predetermined offset value b from the bitstream;
    (c2) generating a prediction pixel block of the second color component image, composed of $\overline{Y_{i,j}}$ predicted using $\overline{Y_{i,j}} = a \times X'_{i,j} + b$,
    where i×j, where i and j are integers, denotes the size of the decoded pixel block of the first color component, $X'_{i,j}$ denotes a pixel value in an $i^{th}$ row and a $j^{th}$ column of the reconstructed pixel block of the first color component image, and $\overline{Y_{i,j}}$, which corresponds to $X'_{i,j}$, denotes a prediction pixel value in an $i^{th}$ row and a $j^{th}$ column of a prediction pixel block of a second color component image;

(c3) decoding a second residue that is a difference between a pixel block of the second color component image and the prediction pixel block of the second color component image included in the bitstream; and (c4) decoding a pixel block of the second color component image by adding the decoded second residue to the prediction pixel block of the second color component image.

4. The image decoding method of claim 3, wherein a and b are determined as values that minimize differences between prediction pixel values of a neighbor pixel block of the second color component image predicted using the pixel values of the decoded neighbor pixel block of the first color component image and the pixel values of the decoded neighbor pixel block of the second color component image.

5. The image decoding method of claim 3, wherein a is 1 and b is an average of differences between the pixel values of the decoded neighbor pixel block of the second color component image and the pixel values of the decoded neighbor pixel block of the first color component image.

6. The image decoding method of claim 4, wherein a and b are determined based on a linear regression model.

7. The image decoding method of claim 3, wherein (c) further comprises decoding a pixel block of the second color component using the decoded pixel block of the first color component image and decoding a pixel block of a third color component image using the decoded pixel block of the second color component image.

8. An image decoding apparatus comprising:
a first color component decoding unit which receives a bitstream including a plurality of encoded color component images comprising a plurality of color components and decodes a pixel block having a predetermined size of a first color component image among the color component images; and a correlation decoding unit which decodes a corresponding pixel block of a second color component image using pixel values of a decoded neighbor pixel block of the previously processed first color component image, pixel values of a decoded neighbor pixel block of the second color component image, and pixel values of the decoded pixel block of the first color component image.

9. The image decoding apparatus of claim 8, wherein the correlation decoding unit generates a prediction pixel block of the second color component image, the prediction pixel block having pixel values $\overline{Y_{i,j}}$ predicted using $\overline{Y_{i,j}} = a \times X'_{i,j} + b$, where i×j, where i and j are integers, denotes the size of the decoded pixel block of the first color component, $X'_{i,j}$ denotes a pixel value in an $i^{th}$ row and a $j^{th}$ column of the reconstructed pixel block of the first color component image, $\overline{Y_{i,j}}$, which corresponds to $X'_{i,j}$, denotes a prediction pixel value in an $i^{th}$ row and a $j^{th}$ column of a prediction pixel block of a second color component image, a denotes a predetermined weight indicating a correlation between the first color component image and the second color component image included in the bitstream, and b denotes a predetermined offset value.

10. The image decoding apparatus of claim 9, wherein a and b are determined as values that minimize differences between prediction pixel values of a neighbor pixel block of the second color component image predicted using the pixel values of the decoded neighbor pixel block of the first color component image and the pixel values of the decoded neighbor pixel block of the second color component image.

11. The image decoding apparatus of claim 9, wherein a is 1 and b is an average of differences between the pixel values of the decoded neighbor pixel block of the second color component image and the pixel values of the decoded neighbor pixel block of the first color component image.

12. The image decoding apparatus of claim 9, wherein a and b are determined based on a linear regression model.

* * * * *